(12) United States Patent
Yamamoto

(10) Patent No.: US 11,192,519 B2
(45) Date of Patent: Dec. 7, 2021

(54) GAS GENERATOR

(71) Applicant: DAICEL CORPORATION, Osaka (JP)

(72) Inventor: Koji Yamamoto, Tokyo (JP)

(73) Assignee: DAICEL CORPORATION, Osaka (JP)

(*) Notice: Subject to any disclaimer, the term of this patent is extended or adjusted under 35 U.S.C. 154(b) by 0 days.

(21) Appl. No.: 16/650,811

(22) PCT Filed: Nov. 6, 2018

(86) PCT No.: PCT/JP2018/041146
§ 371 (c)(1),
(2) Date: Mar. 25, 2020

(87) PCT Pub. No.: WO2019/098089
PCT Pub. Date: May 23, 2019

(65) Prior Publication Data
US 2020/0254962 A1 Aug. 13, 2020

(30) Foreign Application Priority Data
Nov. 20, 2017 (JP) .............................. JP2017-222374

(51) Int. Cl.
*B60R 21/264* (2006.01)
*B60R 21/26* (2011.01)

(52) U.S. Cl.
CPC ... *B60R 21/264* (2013.01); *B60R 2021/26011* (2013.01); *B60R 2021/26029* (2013.01); *B60R 2021/26076* (2013.01)

(58) Field of Classification Search
CPC ............... B60R 21/261; B60R 21/264; B60R 2021/26011; B60R 2021/26029; B60R 2021/26076
See application file for complete search history.

(56) References Cited

U.S. PATENT DOCUMENTS 5,269,561 A 12/1993 Davis et al.
5,636,865 A * 6/1997 Riley .................. B60R 21/2644
280/728.2
(Continued)

FOREIGN PATENT DOCUMENTS

JP 6-183310 A 7/1994
JP 2001-151071 A 6/2001
(Continued)

OTHER PUBLICATIONS

International Preliminary Report on Patentability and English translation of the Written Opinion of the International Searching Authority for International Application No. PCT/JP2018/041146, dated May 26, 2020.
(Continued)

*Primary Examiner* — Bret Hayes
(74) *Attorney, Agent, or Firm* — Birch, Stewart, Kolasch & Birch, LLP

(57) ABSTRACT

Provided is a gas generator including the housing with a gas discharge port. The housing has a circular shape and includes a top plate, a bottom plate, and a peripheral wall, the housing having a ratio of an axial length L to an outer diameter D satisfying L/D≤1.1. The gas discharge port includes first opening portions having low burst pressure (P1) of the closing member and second opening portions having burst pressure (P2) higher than the burst pressure (P1). The first opening portions and second opening portions are formed on a circumference of a same circle in at least one of the peripheral wall or the top plate, and the first opening portion and the second opening portion, which are adjacent to each other in a circumference direction, are arranged such that an angle (θ1) formed by a first center line extending from a center of the same circle to a center of the first opening portion and a second center line extending from the
(Continued)

center of the same circle to a center of the second opening portion is in a range from 15° to 65°.

9 Claims, 10 Drawing Sheets

(56) References Cited

U.S. PATENT DOCUMENTS

| | | | | |
|---|---|---|---|---|
| 5,752,715 | A | * | 5/1998 | Pripps ................. B60R 21/2171 |
| | | | | 280/732 |
| 5,967,551 | A | * | 10/1999 | Newkirk ............. B60R 21/2171 |
| | | | | 280/736 |
| 2002/0190511 | A1 | | 12/2002 | Watase et al. |
| 2005/0134031 | A1 | * | 6/2005 | McCormick .......... B60R 21/264 |
| | | | | 280/741 |
| 2006/0255578 | A1 | * | 11/2006 | Choi ..................... B60R 21/217 |
| | | | | 280/740 |
| 2008/0143088 | A1 | | 6/2008 | Yamazaki |
| 2009/0115175 | A1 | * | 5/2009 | Nishimura .......... B60R 21/2644 |
| | | | | 280/741 |
| 2016/0052482 | A1 | * | 2/2016 | Bierwirth .............. B60R 21/263 |
| | | | | 280/740 |
| 2019/0023220 | A1 | * | 1/2019 | Takizawa ............ B60R 21/2644 |

FOREIGN PATENT DOCUMENTS

| | | |
|---|---|---|
| JP | 2008-149873 A | 7/2008 |
| JP | 2008-201243 A | 9/2008 |

OTHER PUBLICATIONS

International Search Report for International Application No. PCT/JP2018/041146, dated Jan. 29, 2019.

* cited by examiner

GAS GENERATOR

TECHNICAL FIELD

The present invention relates to a gas generator that can be used as a gas generator for an airbag device mounted in a vehicle.

BACKGROUND ART

A gas generator used in an airbag device typically includes a plurality of gas discharge ports arranged at equal intervals in a circumferential direction of a housing. When the gas generator is operated, gas is discharged radially from the plurality of gas discharge ports to inflate an airbag. However, in consideration of, e.g., the mounting position of the airbag device in the vehicle, and changes in the surrounding temperature environment, an invention has been made, which is known as an invention in which the position, size, and the like of the gas discharge ports in the gas generator are adjusted.

In the invention of JP 2008-201243 A, a gas generator is disclosed in which six pairs of large-diameter gas discharge ports 15a and 15b having the same opening area are formed on the peripheral wall of the gas generator, one pair of small-diameter gas discharge ports 16a and 16b is formed in a portion orthogonal to the pair of the large-diameter gas discharge ports, and the large-diameter gas discharge ports and the small-diameter gas discharge ports are closed by a seal tape having the same thickness. When the gas generator is operated, a greater amount of gas is discharged from the large-diameter gas discharge ports 15a and 15b to deploy the airbag in a prioritized particular direction.

In the invention of JP 06-183310 A, a gas generator is disclosed in which three types of orifices having different diameters are formed in the peripheral wall of a housing. The first orifice 26 has an area larger than an area of the second orifice 28, and both of the orifices 26 and 28 are formed to be deviated from one another in the housing. The third orifice 34 is also formed at the end portion of the housing, the opening area of which is an intermediate of the opening area of the first orifice 26 and the opening area of the second orifice 28. In addition, the foil 36 covering the third orifice is thicker than the foil 32 covering the first and second orifices.

These orifices regulate differences in internal housing pressures and output powers resulting therefrom, which occur due to differences in environmental temperature during operation.

SUMMARY OF INVENTION

A first aspect of the present invention (hereinafter referred to as a "first aspect") provides a gas generator accommodating in a housing thereof a gas generating agent and an igniter, the housing including a gas discharge port, wherein the housing has a circular shape in a plan view, includes a top plate, a bottom plate opposing the top plate in an axial direction, and a peripheral wall between the top plate and the bottom plate, the housing having a ratio of an axial length L to an outer diameter D satisfying relationship, L/D<1.1, the gas discharge port is closed by a closing member and includes, in combination, a plurality of first opening portions having low burst pressure (P1) of the closing member and a plurality of second opening portions having burst pressure (P2) higher than the burst pressure (P1), the plurality of first opening portions and the plurality of second opening portions are formed at intervals on a circumference of a same circle in at least one of the peripheral wall or the top plate, and one of the plurality of first opening portions and one of the plurality of second opening portions which are adjacent to each other in a circumference direction, are arranged such that an angle ($\theta 1$) formed by a first center line extending from a center of the same circle to a center of the one of the plurality of first opening portions and a second center line extending from the center of the same circle to a center of the one of the plurality of second opening portions is in a range from 15° to 65°.

A second aspect of the present invention (hereinafter referred to as a "second aspect") provides a gas generator accommodating in a housing thereof a gas generating agent and an igniter, the housing including a gas discharge port, wherein the housing has a circular shape in a plan view and includes a top plate, a bottom plate opposing the top plate in an axial direction, and a peripheral wall between the top plate and the bottom plate, the housing having a ratio of an axial length L to an outer diameter D satisfying relationship, L/D≤1.1, the gas discharge port is closed by a closing member and include in combination, a plurality of first opening portions having low burst pressure (P1) of the closing member and a plurality of second opening portions having burst pressure (P2) higher than the burst pressure (P1), the plurality of first opening portions and the plurality of second opening portions are formed at intervals on a circumference of a same circle in at least one of the peripheral wall or the top plate, an arrangement pattern of the plurality of first opening portions and the plurality of second opening portions is selected from one of:

an arrangement pattern (a) in which the plurality of first opening portions form a plurality of first opening portion groups, with each group being spaced apart from each other, and one of the plurality of second opening portions is arranged between the first opening portion groups, an arrangement pattern (b) in which the plurality of second opening portions form a plurality of second opening portion groups, with each group being spaced apart from each other, and one of the plurality of first opening portions is arranged between the second opening portion groups, an arrangement pattern (c) in which the plurality of first opening portions form a plurality of first opening portion groups, with each group being spaced apart from one another, the plurality of second opening portions form a plurality of second opening portion groups, with each group being spaced apart from each other, and the first opening portion groups and the second opening portion groups are arranged at intervals in a circumference direction, an arrangement pattern (d) in which in the arrangement pattern (c), one of the first opening portions or the second opening portions is arranged independently between the first opening portion group and the second opening portion group, between the first opening portion groups, or between the second opening portion groups, an arrangement pattern (e) including an arrangement in which in the arrangement pattern (c), one of the second opening portions is arranged independently among the first opening portion groups or one of the first opening portions is arranged independently among the second opening portion groups, and an arrangement pattern (f) including a part of one or more arrangement patterns selected from the arrangement patterns (a) to (e), and the first opening portion and the second opening portion, which are adjacent to each other in a circumference direction, are arranged such that an angle (θ1) formed by a first center line extending from a center of the same circle to a center of the first opening portion and a second center line extending from the center of the same circle to a center of the second opening portion is in a range from 15° to 65°.

A third aspect of the present invention (hereinafter referred to as a "third aspect") provides a gas generator accommodating in a housing thereof a gas generating agent and an igniter, the housing including a gas discharge port, wherein the housing has a circular shape in a plan view, and includes a top plate, a bottom plate opposing the top plate in an axial direction, and a peripheral wall between the top plate and the bottom plate, the housing having a ratio of an axial length L to an outer diameter D satisfying the relationship, $L/D \leq 1.1$, the igniter is fixed to the bottom plate and accommodated in a cup member including a plurality of flame-transferring holes formed in a peripheral wall thereof and abutting, at a side of an opening portion thereof, against the bottom plate, the plurality of flame-transferring holes are unevenly distributed on a semicircular side (first semicircular side) of the peripheral wall of the cup member, the cup member has a circular shape in a plan view and is arranged in a combustion chamber formed in the housing such that the cup member is located at a position eccentrically with respect to a center of the housing and the first semicircular side of the cup member is far from the peripheral wall of the housing, the gas discharge port is closed by a closing member and includes, in combination, a plurality of first opening portions having low burst pressure (P1) of the closing member and a plurality of second opening portions having burst pressure (P2) higher than the burst pressure (P1), the plurality of first opening portions and the plurality of second opening portions are formed at intervals on a same circumference on at least one of the peripheral wall or the top plate, an arrangement pattern of the plurality of first opening portions and the plurality of second opening portions is any one of the arrangement patterns (a) to (f) according to the second aspect, and when a semicircular side of the housing corresponding to the first semicircular side of the peripheral wall of the cup member on which the plurality of flame-transferring holes are unevenly distributed is defined as a first semicircular region and a remaining semicircular side is defined as a second semicircular region, a ratio (A2/A1) of total opening area (A2) of the plurality of first opening portions and the plurality of second opening portions formed in the second semicircular region to total opening area (A1) of the plurality of first opening portions and the plurality of second opening portions formed in the first semicircular region is in a range from 0.25 to 0.40.

A fourth aspect of the present invention (hereinafter referred to as a "fourth aspect") provides a gas generator accommodating in a tubular housing thereof a gas generating agent and an igniter, the tubular housing including a gas discharge port, wherein the tubular housing has a circular shape in a cross section in a width direction, and has a ratio of an axial length L to an outer diameter D satisfying relationship, $L/D > 1.1$, the igniter is attached to either one of end portions of the tubular housing, the gas discharge port is closed by a closing member, and includes, in combination, a plurality of first opening portions having low burst pressure (P1) of the closing member and a plurality of second opening portions having burst pressure (P2) higher than the burst pressure (P1), the plurality of first opening portions and the plurality of second opening portions are formed on a circumference of a same circle on a peripheral wall of the tubular housing, and the first opening portion and the second opening portion, which are adjacent to each other in a circumference direction, are arranged such that an angle (θ1) formed by a first center line extending from a center of the same circle to a center of the first opening portion and a second center line extending from the center of the same circle to a center of the second opening portion is in a range from 15° to 65°.

A fifth aspect of the present invention (hereinafter referred to as a "fifth aspect") provides a gas generator accommodating in a tubular housing thereof a gas generating agent and an igniter, the tubular housing including a gas discharge port, wherein the tubular housing has a circular shape in a cross section in a width direction, and has a ratio of an axial length L to an outer diameter D satisfying relationship, $L/D > 1.1$, the igniter is attached to either one of end portions of the tubular housing, the gas discharge port is closed by a closing member, and includes in combination, a plurality of first opening portions having low burst pressure (P1) of the closing member and a plurality of second opening portions having burst pressure (P2) higher than the burst pressure (P1), the plurality of first opening portions and the plurality of second opening portions are formed on a circumference of a same circle in a peripheral wall of the tubular housing, an arrangement pattern of the plurality of first opening portions and the plurality of second opening portions includes an arrangement pattern (a) in which the plurality of first opening portions form a plurality of first opening portion groups, with each group being spaced apart from each other, and one of the plurality of second opening portions is arranged between the first opening portion groups, an arrangement pattern (b) in which the plurality of second opening portions form a plurality of second opening portion groups, with each group being spaced apart from each other, and one of the plurality of first opening portions is arranged between the second opening portion groups, an arrangement pattern (c) in which the arrangement pattern (a) and the arrangement pattern (b) are combined, an arrangement pattern (d) in which in the arrangement pattern (c), one of the first opening portions or the second opening portions is arranged independently between the first opening portion group and the second opening portion group, between the first opening portion groups, or between the second opening portion groups, an arrangement pattern (e) in which in the arrangement pattern (c), one of the second opening portions is arranged independently among the first opening portion groups or one of the first opening portions is arranged independently among the second opening portion groups, an arrangement pattern (f) including a part of one or more arrangement patterns selected from the arrangement patterns (a) to (e), and one or more arrangement patterns selected from the arrangement patterns (a) to (f) are formed in a plurality of rows in the axial direction.

BRIEF DESCRIPTION OF DRAWINGS

The present invention will be more fully understood from the detailed description and accompanying drawings, which are given hereinbelow for explanation only and do not limit the present invention.

DESCRIPTION OF EMBODIMENTS

Figure 1:
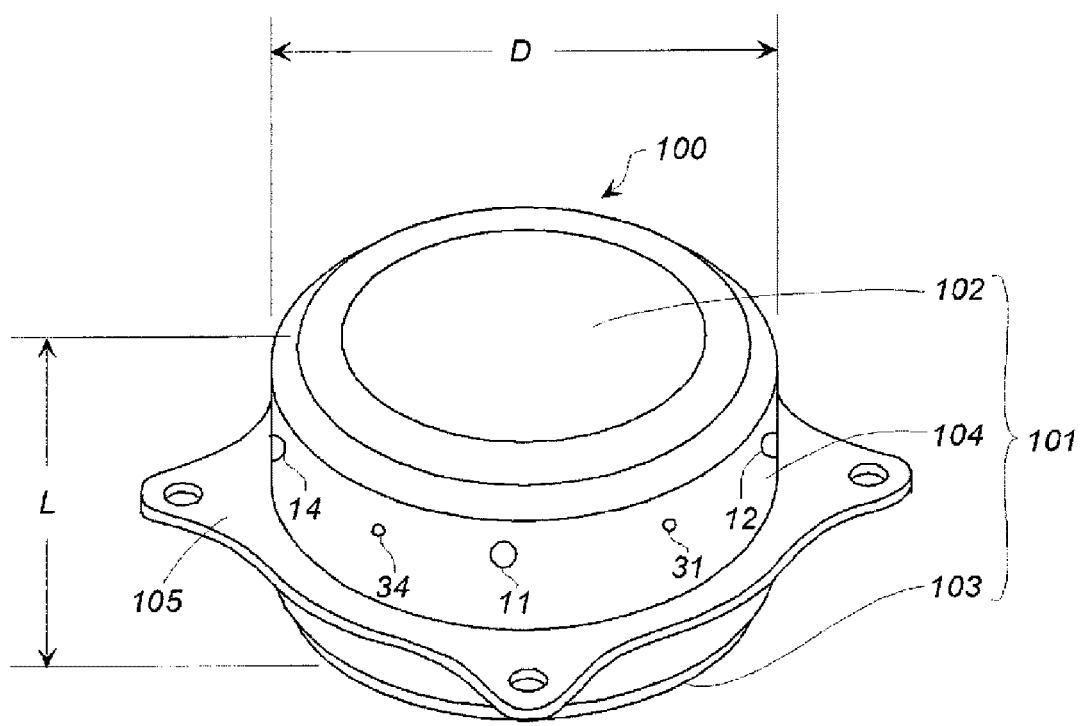
FIG. 1 is a perspective view of a housing used in a gas generator, and is used only to indicate positions of gas discharge ports.

The invention of JP 2008-201243 A intends to direct gas discharge to a prioritized particular direction, and discloses only an example in which all gas discharge ports are cleaved (paragraph numbers 0036 and 0037), and does not intend to control burst pressure of a seal tape by making use of gas discharge ports of different sizes.

The present invention provides a gas generator including a gas discharge port including a plurality of first opening portions having low burst pressure (P1) of a closing member, such as a seal tape, that closes the opening portion of the gas discharge port, and a plurality of second opening portions having burst pressure (P2) higher than the burst pressure (P1). With this generator, as designed, the first opening portions open first and subsequently the second opening portions open next, or only the first opening portions open, while the opening of the first opening portions does not influence the opening of the second opening portions.

The gas generator of a first aspect can be applied to both a single type gas generator including one igniter configured to ignite a gas generating agent and a dual type gas generator including two igniters. The gas generator of the first aspect can also be applied to a hybrid type gas generator that uses both a gas generating agent and pressurized gas. This applies to other aspects below.

A housing of the gas generator of the first aspect has a disk shape in which a ratio of an axial length L to an outer diameter D satisfies relationship, $L/D \leq 1.1$.

A gas discharge port may be formed in a peripheral wall, a top plate part, or both the peripheral wall and the top plate part, depending on an installation location of the gas generator in a vehicle, or the like.

The arrangement of the plurality of first opening portions and the plurality of second opening portions include, in addition to an arrangement in which the plurality of first opening portions and the plurality of second opening portions are formed such that centers thereof are located on the same circumference, an arrangement in which both of centers of the plurality of first opening portions and the plurality of second opening portions, which are located on the same circumference and these centers, which are not locating on the same circumference, coexist (including an arrangement in which the centers of the plurality of first opening portions are located on a first same circumference and the centers of the plurality of second opening portions are located on a second same circumference, but the first same circumference and the second same circumference are no identical to each other and different), and an arrangement in which the centers of the plurality of first opening portions and the centers of the plurality of second opening portions are not located on the same circumference but at least some of these opening portions are located on the same circumference.

The gas discharge port may be closed from inside by a metallic seal tape for moisture prevention.

The gas discharge port is closed by a closing member, and includes, in combination, the plurality of first opening portions having low burst pressure (P1) of the closing member and the plurality of second opening portions having burst pressure (P2) higher than the burst pressure (P1) (P1<P2).

The first opening portion having the burst pressure (P1) and the second opening portion having the burst pressure (P2) may have any one of:

(i) a configuration in which an opening diameter of the first opening portion is larger than an opening diameter of the second opening portion, and the first opening portion and the second opening portion are closed by the same seal tape;

(ii) a configuration in which the opening diameter of the first opening portion and the opening diameter of the second opening portion are the same, and tensile strength of the seal tape (first seal tape) closing the first opening portion and the seal tape (second seal tape) closing the second opening portion satisfies relationship, i.e., the tensile strength of the first seal tape<the tensile strength of the second seal tape; and (iii) a configuration in which the above (i) and (ii) are combined.

An arrangement pattern of the plurality of first opening portions and the plurality of second opening portions is appropriately adjusted depending on a function required for the gas generator. However, in the gas generator of the present invention, it is desirable to satisfy following requirements to solve problems of the present invention.

That is, the first opening portion and the second opening portion, which are adjacent to each other in a circumference direction of the same circle, are arranged such that an angle ($\theta 1$) formed by a first center line extending from a center of the same circle to a center of the first opening portion and a second center line extending from the center of the same circle to a center of the second opening portion is in a range from 15° to 65°.

The gas generator of the first aspect ensures a function during operation, in which, when mainly the first opening portion opens first and subsequently the second opening portion opens next, or a function in which only the first opening portion opens. When an airbag device using this gas generator is operated, a gas generating agent is combusted and combustion gas is generated, whereby the airbag can be inflated.

At this time, in a case where the first opening portion and the second opening portion are arranged in proximity, the first opening portion opens first as prioritized and the combustion gas flow concentrates on the opened first opening portion. As a result, a problem may arise whereby the neighboring second opening portion is influenced by the combustion gas flow and opens concomitantly. This problem may arise in both a single type gas generator including one igniter and a dual type gas generator including two igniters, but this problem may be a critical problem, in particular, for the dual type gas generator in which two igniters activate with a time lag.

However, in the gas generator of the first aspect, the first opening portion and the second opening portion are arranged to form a predetermined angle (θ1) range, hence, the second opening portion is less likely to be influenced by the combustion gas flow to the opened first opening portion, and thus, the above-described problem in that the second opening portion opens when the opening is not desired can be prevented.

The gas generator of the second aspect can be applied to both a single type gas generator including one igniter configured to ignite and burn a gas generating agent and a dual type gas generator including two igniters. The gas generator of the second aspect can also be applied to a hybrid type gas generator that uses both a gas generating agent and pressurized gas.

A housing of the gas generator of the second aspect has a disk shape in which a ratio of an axial length L to an outer diameter D satisfies relationship, $L/D \leq 1.1$.

A gas discharge port may be formed in a peripheral wall, a top plate part, or both the peripheral wall and the top plate part, depending on an installation location or the like of the gas generator.

The arrangement of the plurality of first opening portions and the plurality of second opening portions include, in addition to an arrangement in which the plurality of first opening portions and the plurality of second opening portions are formed such that centers thereof are located on the same circumference, an arrangement in which both of centers of the plurality of first opening portions and the plurality of second opening portions, which are located on the same circumference, and these centers, which are not located on the same circumference, coexist (including an arrangement in which the centers of the plurality of first opening portions are located on a first same circumference and the centers of the plurality of second opening portions are located on a second same circumference, but the first same circumference and the second same circumference are not identical to each other and different), and an arrangement in which the centers of the plurality of first opening portions and the plurality of second opening portions are not located on the same circumference but at least some of these opening portions are located on the same circumference.

The gas discharge port may be closed from inside by a metallic seal tape for moisture prevention.

The gas discharge port is closed by a closing member and includes, in combination, the plurality of first opening portions having low burst pressure (P1) of the closing member and the plurality of second opening portions having burst pressure (P2) higher than the burst pressure (P1) (P1<P2).

The first opening portion having the burst pressure (P1) and the second opening portion having the burst pressure (P2) may have any one of the configurations (i), (ii), or (iii) of the gas generator of the first aspect.

The arrangement patterns of the plurality of first opening portions and the plurality of second opening portions are selected from arrangement patterns (a) to (f). The arrangement patterns of the plurality of first opening portions and the plurality of second opening portions are adjusted in accordance with requirements for gas generators that differ depending on installation locations inside vehicles, vehicle models, and the like. The arrangement patterns (a) to (f) are specific arrangement states of the plurality of first opening portions and the plurality of second opening portions.

In the arrangement pattern (a), for example, three first opening portions form one group, and a total of three groups (Group-1a, Group-2a, Group-3a) are arranged; and one second opening portion is arranged between Group-1a and Group-2a, and another one between Group-2a and Group-3a, and moreover another one between Group-3a and Group-1a.

In the arrangement pattern (b), for example, three second opening portions form one group, and a total of three groups (Group-1b, Group-2b, Group-3b) are arranged; and one first opening portion is arranged between Group-1b and Group-2b, and another one between Group-2b and Group-3b, and moreover another one between Group-3b and Group-1b.

In the arrangement pattern (c), for example, two first opening portions form one group and a total of three groups (Group-1a, Group-2a, Group-3a) are arranged; and two second opening portions form one group and a total of three groups (Group-1b, Group-2b, Group-3b) are arranged. An arrangement order of these groups is determined according to the performance required for the gas generator, and as long as the performance is achieved in a prescribed range, the groups may be arranged in order of regularity or randomly. For example, the pattern can be formed by arranging groups alternately, i.e., Group-1a, Group-1b, Group-2a, Group 2b, Group 3a, and Group 3b on the same circumference, with intervals between each group being equal.

The arrangement pattern (d) is an arrangement pattern in which, in the arrangement pattern (c), one first opening portion or one second opening portion is arranged between adjacent groups.

The arrangement pattern (e) is an arrangement pattern in which, in the arrangement pattern (c), one first opening portion or one second opening portion is arranged between the plurality of first opening portions or the plurality of second opening portions constituting each group. For example, when Group 1a is formed of four first opening portions, the arrangement pattern (e) is an arrangement pattern in which one second opening portion is arranged at an intermediate position of the four first opening portions, and when Group 1b is formed of four second opening portions, the arrangement pattern (e) is an arrangement pattern in which one first opening portion is arranged at an intermediate position of the four second opening portions.

In the arrangement pattern (f), for example, the plurality of first opening portions and the plurality of second opening portions are formed according to one arrangement pattern on a half part (½ circumference) of the same circumference while formed according to another arrangement pattern on the remaining ½ part of the circumference. For example, ½ circumference can be in the arrangement pattern (a) and the remaining ½ circumference can be in the arrangement pattern (b).

A preferable aspect of the gas generator of the second aspect has an arrangement in which, in the arrangement patterns (b), (c), (d), and (e), intervals between the plurality of second opening portions forming the second opening portion group are equal, and an angle ($\theta 2$) formed by two center lines extending from the center of the same circle to the centers of adjacent second opening portions is arranged to be in a range from 10° to 30°, with $\theta 1 > \theta 2$ being satisfied.

The arrangement patterns (b), (c), (d), and (e) all include the second opening portion groups.

In the second opening portions of the second opening portion group, adjacent second opening portions satisfy $\theta 2 = 10°$ to 30° and satisfy ($\theta 1$)=15° to 65° and $\theta 1 > \theta 2$ at the same time. As a result, when $\theta 2 = 30°$ for example, $\theta 1$ is always an angle greater than 30°.

With $\theta 1$ and $\theta 2$ being implemented in this manner, as in the first aspect the second opening portion can be prevented from being influenced by the opened first opening portion, hence, flexibility in the arrangement of the second opening portions can be increased, thereby allowing a gas discharge direction to be adjusted as desired.

In another preferable aspect of the gas generator of the second aspect, in the arrangement pattern (a), intervals (L1) between the plurality of first opening portions forming the first opening portion group are equal, and the L1 and an interval (L3) between the first opening portion and the second opening portion adjacent thereto in the circumference direction satisfy relationship of L1<L3.

In the arrangement pattern (a), for example, three first opening portions form one group, and a total of three groups (Group-1a, Group-2a, Group-3a) are arranged; and one second opening portion is arranged between Group-1a and Group-2a, and another one between Group-2a and Group-3a, and moreover another one between Group 3a and Group 1a.

Intervals (L1) among three first opening portions in each of Group-1a, Group-2a, and Group-3a are equal. When there is one second opening portion between Group-1a and Group-2a, an interval (L3) between the second opening portion and the first opening portion in Group-1a adjacent thereto in the circumference direction, or an interval (L3) between the second opening portion and the first opening portion in Group-2a adjacent thereto in the circumference direction satisfies relationship of L1<L3.

With the relationship of L1<L3 being satisfied in this manner, as in the first aspect the second opening portion can be prevented from being influenced by the combustion gas flow discharged from the opened first opening portion.

In the gas generator of another preferable aspect of the second aspect, in the arrangement pattern (b), intervals (L2) between the plurality of second opening portions forming the second opening portion group are equal, and the L2 and an interval (L3) between the second opening portion and the first opening portion adjacent thereto in the circumference direction satisfy relationship of L3>L2.

In the arrangement pattern (b), for example, three second opening portions form one group, and three groups (Group-1b, Group-2b, Group-3b) are arranged; and one first opening portion is arranged between Group-1b and Group-2b, and another one between Group-2b and Group-3b, and moreover another one between Group-3b and Group-1b.

Intervals (L2) among three second opening portions in each of Group 1b, Group-2b, and Group-3b are equal. When there is one first opening portion between Group-1b and Group-2b, an interval (L3) between the first opening portion and the second opening portion in Group-1b adjacent thereto in the circumference direction, or an interval (L3) between the first opening portion and the second opening portion in Group-2 b adjacent thereto in the circumference direction satisfies relationship of L2<L3.

With the relationship of L2<L3 being satisfied in this manner, as in the first aspect the second opening portion can be prevented from being influenced by the combustion gas flow discharged from the opened first opening portion.

In the gas generator of another preferable aspect of the second aspect, in the arrangement pattern (c), intervals (L1) between the plurality of first opening portions forming the first opening portion group are equal, and intervals (L2) between the plurality of second opening portions forming the second opening portion group are equal, and the L1, the L2, and an interval (L3) between the first opening portion and the second opening portion, which are adjacent to each other in the circumference direction, satisfy relationships of L3>L1 and L3>L2.

In the arrangement pattern (c), for example, two first opening portions form one group and three groups (Group-1a, Group-2a, Group-3a) are arranged, and two second opening portions form one group and three groups (Group-1b, Group-2b, Group-3b) are arranged, and furthermore, each group is arranged alternately, i.e., Group-1a, Group-1b, Group-2a, Group-2b, Group-3a, and Group-3b on the same circumference, with intervals between each group being equal.

An interval between the first opening portions in the first opening portion groups (Group-1a, Group-2a, Group-3a) is L1. An interval between the second opening portions in the second opening portion groups (Group-1b, Group-2b, Group-3b) is L2. Group-1a and Group-1b are adjacent to each other in the circumference direction, and an interval between the first opening portion (endmost first opening portion) at an endmost part of Group-1a and the second opening portion located at a position closest to the endmost first opening portion, out of the second opening portions, in Group-1b is L3.

L1, L2, and L3 satisfy relationships of L3>L1 and L3>L2. With relationships of L3>L1 and L3>L2 being satisfied in this manner, as in the first aspect the second opening portion can be prevented from being influenced by the combustion gas flow discharged from the opened first opening portion.

In the gas generator of another preferable aspect of the second aspect, in the arrangement pattern (d), intervals (L1) between the plurality of first opening portions forming the first opening portion group are equal, intervals (L2) between the plurality of second opening portions forming the second opening portion group are equal, and the L1, the L2, and an interval (L3) between the first opening portion arranged independently between the first opening portion group and the second opening portion group and the second opening portion (adjacent second opening portion) in the second opening portion group adjacent to the first opening portion arranged independently, or an interval (L3) between the second opening portion arranged independently between the first opening portion group and the second opening portion group and the first opening portion (adjacent first opening portion) in the first opening portion group adjacent to the second opening portion arranged independently satisfy relationships of L3>L1 and L3>L2.

The arrangement pattern (d) is an arrangement pattern in which, in the arrangement pattern (c), one first opening portion or one second opening portion is arranged between Group-1a and Group-1b, another one between Group-1b and Group-2a, another one between Group-2a and Group-2b, another one between Group-2b and Group-3a, another between Group-3a and Group-3b, and another one between Group-3b and Group-1a.

An interval between the first opening portions in the first opening portion groups (Group-1a, Group-2a, Group-3a) is L1. An interval between the second opening portions in the second opening portion groups (Group-1b, Group-2b, Group-3b) is L2. An interval between the first opening portion arranged independently between Group-1a and Group-1b and the second opening portion in Group-1b adjacent to the first opening portion arranged independently, or an interval between the second opening portion arranged independently between Group-1a and Group-1b and the first opening portion in Group 1a adjacent to the second opening portion arranged independently is L3.

L1, L2, and L3 satisfy relationships of L3>L1 and L3>L2. With relationships of L3>L1 and L3>L2 being satisfied in this manner, as in the first aspect the second opening portion can be prevented from being influenced by the combustion gas flow discharged from the opened first opening portion.

In the gas generator of another preferable aspect of the second aspect, in the arrangement pattern (e), intervals (L1) between the plurality of first opening portions forming the first opening portion group are equal, the L1 and an interval (L3) between the first opening portion and the second opening portion adjacent thereto in the circumference direction satisfy relationship of L3>L1, and intervals (L2) between the plurality of second opening portions forming the second opening portion group are equal, and the L2 and an interval (L3) between the second opening portion and the first opening portion adjacent thereto in the circumference direction satisfy relationship of L3>L2.

The arrangement pattern (e) is an arrangement pattern in which, in the arrangement pattern (c), when the first opening portion group (for example, Group-1a) is formed of four first opening portions, one second opening portion is arranged at an intermediate position of four first opening portions, or when the second opening portion group (for example, Group-1b) is formed of four second opening portions, one first opening portion is arranged at an intermediate position of four second opening portions.

An interval among the first opening portions in the first opening portion groups (Group-1a, Group-2a, Group-3a) is L1. An interval among the second opening portions in the second opening portion groups (Group-1b, Group-2b, Group-3b) is L2. In a case where there is one second opening portion at the intermediate position of four first opening portions, intervals between the second opening portion and the first opening portions adjacent thereto on both sides of the second opening portion are L3, or in a case where there is one first opening portion at the intermediate position of four second opening portions, intervals between the first opening portion and the second opening portions adjacent thereto on both sides of the first opening portion are L3.

L1, L2, and L3 satisfy relationships of L3>L1 and L3>L2. With relationships of L3>L1 and L3>L2 being satisfied in this manner, as in the first aspect the second opening portion can be prevented from being influenced by the combustion gas flow discharged from the opened first opening portion.

Furthermore, when the four first opening portions form two groups each including two first opening portions, the arrangement pattern (e) may be an arrangement pattern in which one second opening portion is arranged at an intermediate position between the two groups.

Similarly, when the four second opening portions form two groups each including two second opening portions, the arrangement pattern (e) may be an arrangement pattern in which one first opening portion is arranged at an intermediate position between the two groups.

In the gas generators of the first aspect, the second aspect, and the above-described other preferable aspects, the plurality of first opening portions and the plurality of second opening portions are formed in a plurality of rows each having the plurality of first opening portions and the plurality of second opening portions that are on the second circumference at different heights in the peripheral wall when the plurality of first opening portions and the plurality of second opening portions are formed in the peripheral wall, and the plurality of first opening portions and the plurality of second opening portions are formed in a plurality of rows forming multiple circles on the top plate when they are formed on the top plate.

When the gas discharge ports are formed in the peripheral wall of the housing, the gas discharge ports are formed in a plurality of rows at different heights. Examples thereof include a configuration in which the gas discharge port (combination of the plurality of first opening portions and the plurality of second opening portions) of a first row is formed on a circumference at the same height, and, at a distance therefrom in a height direction, the gas discharge port (combination of the plurality of first opening portions and the plurality of second opening portions) of a second row is formed on a circumference at the same height, and moreover the gas discharge ports of a third and subsequent rows are formed in a similar way.

When the gas discharge port is formed on the top plate of the housing, the gas discharge ports are formed in a plurality of rows to form multiple circles. Examples thereof include a configuration in which the gas discharge port (combination of the plurality of first opening portions and the plurality of second opening portions) of a first row is formed on a circumference of one same circle on the top plate, and at a distance therefrom, the gas discharge port (combination of the plurality of first opening portions and the plurality of second opening portions) of a second row is formed at an inner side thereof, and moreover the gas discharge ports of a third and subsequent rows are formed in a similar way.

A housing of the gas generator of the third aspect has a disk shape in which a ratio of an axial length L to an outer diameter D satisfies relationship, $L/D \le 1.1$.

The gas discharge port may be formed in a peripheral wall, a top plate part, or both the peripheral wall and the top plate part, depending on an installation location of the gas generator, or the like.

The arrangement of the plurality of first opening portions and the plurality of second opening portions include, in addition to an arrangement in which the plurality of first opening portions and the plurality of second opening portions are formed such that centers thereof are located on the same circumference, an arrangement in which both of centers of the plurality of first opening portions and the plurality of second opening portions, which are located on the same circumference, and these centers, which are not located on the same circumference, coexist (including an arrangement in which the centers of the plurality of first opening portions are located on a first same circumference and the centers of the plurality of second opening portions are located on a second same circumference, but the first same circumference and the second same circumference are not identical to each other and different), and an arrangement in which the centers of the plurality of first opening portions and the plurality of second opening portions are not located on the same circumference but at least some of these opening portions are located on the same circumference.

The gas discharge port may be closed from inside by a metallic seal tape for moisture prevention.

The gas discharge port is closed by a closing member, and includes, in combination, the plurality of first opening portions having low burst pressure (P1) of the closing member and the plurality of second opening portions having burst pressure (P2) higher than the burst pressure (P1).

The first opening portion having the burst pressure (P1) and the second opening portion having the burst pressure (P2) may have any one of the configurations (i), (ii), or (iii) of the gas generator of the first aspect.

The igniter is accommodated in a cup member including a plurality of flame-transferring holes in the peripheral wall.

The cup member has a circular shape in a plan view and the plurality of flame-transferring holes are unevenly distributed on a semicircular side (first semicircular side) of a peripheral wall of the cup member. Of the total number of the plurality of flame-transferring holes, ⅔ or greater thereof are formed on the first semicircular side, and the remainder is formed on the other semicircular side (second semicircular side). All the flame-transferring holes have the same size, and thus, during operation, a greater amount of combustion products containing flame is released from the first semicircular side, in which a larger number of flame-transferring holes exist.

Furthermore, the cup member (i.e., igniter) is arranged at a position eccentrically with respect to the center of the housing, and thus, the first semicircular side of the cup member is located at a position far from the peripheral wall of the housing, and the second semicircular side is located at a position closer to the peripheral wall of the housing.

Thus, a volume of the combustion chamber facing the first semicircular side of the cup member located far from the peripheral wall of the housing is larger than a volume of the combustion chamber facing the second semicircular side located closer to the housing peripheral wall, hence more gas generating agents are present on the first semicircular side.

When a semicircular side of the housing corresponding to the semicircular side (first semicircular side) of the peripheral wall of the cup member, on which the plurality of flame-transferring holes are unevenly distributed, is defined as a first semicircular region and the remaining second semicircular side is defined as a second semicircular region, a ratio (A2/A1) of a total opening area (A2) of the plurality of first opening portions and the plurality of second opening portions, which are formed in the second semicircular region, to a total opening area (A1) of the plurality of first opening portions and the plurality of second opening portions, which are formed in the first semicircular region, is in a range from 0.25 to 0.40.

As described above, there are more gas generating agents in the first semicircular region due to following relationship:

a volume of combustion chamber on the first semicircular side (i.e., a volume of first semicircular region) of the cup member located far from the housing>a volume of combustion chamber on the second semicircular side (i.e., a volume of second semicircular region) located closer to the housing.

Therefore, a larger number of flame-transferring holes are formed for the gas generating agents in the first semicircular region having a large combustion surface area, and thus, the combustion of the gas generating agents in the first semicircular region is facilitated.

In addition, opening portions of the flame-transferring holes are provided corresponding to the combustion surface area of the gas generating agents in the combustion chamber in each of the first semicircular region and the second semicircular region, and thus, there is almost no difference in the combustibility of the gas generating agents between the first semicircular region and the second semicircular region.

A housing of the gas generator of the fourth aspect has a cylinder shape in which a ratio of an axial length L to an outer diameter D satisfies relationship, L/D>1.1.

The gas discharge port is formed in the peripheral wall, and the forming position thereof can be adjusted depending on an installation location of the gas generator, and the like.

The plurality of first opening portions and the plurality of second opening portions are formed to have respective centers thereof on a circumference of the same circle.

The gas discharge port may be closed from inside by a metallic seal tape for moisture prevention.

The same applies to other aspects of embodiments below.

The gas discharge port is closed by a closing member, and includes, in combination, the plurality of first opening portions having low burst pressure (P1) of the closing member and the plurality of second opening portions having burst pressure (P2) higher than the burst pressure (P1) (P1<P2).

The first opening portion having the burst pressure (P1) and the second opening portion having the burst pressure (P2) may have any one of the configurations (i), (ii), or (iii) of the gas generator of the first aspect. The same applies to other aspects below.

The first opening portion and the second opening portion, which are adjacent to each other in a circumference direction of the same circle, are arranged such that an angle ($\theta 1$) formed by a first center line extending from a center of the same circle to a center of the first opening portion and a second center line extending from the center of the same circle to a center of the second opening portion is in a range from 15° to 65°.

The gas generator of the fourth aspect also ensures a function during operation, in which when mainly the first opening portion opens first and subsequently the second opening portion opens next, or when only the first opening portion opens. When an airbag device using this gas generator is operated, a gas generating agent is combusted and combustion gas is generated, whereby the airbag can be inflated.

At this time, in a case where the first opening portion and the second opening portion are arranged in proximity, when the closed first opening portion opens first as prioritized, the combustion gas flow concentrates on the opened first opening portion. As a result, a problem may arise whereby the neighboring second opening portion is influenced by the combustion gas flow and opens concomitantly. This problem may arise in both a single type gas generator including one igniter and a dual type gas generator including two igniters, but this problem may be a critical problem, in particular, for the dual type gas generator in which two igniters are activated with a time lag.

However, in the gas generator of the fourth aspect, the first opening portion and the second opening portion are arranged to form a predetermined angle range ($\theta 1$), and the second opening portion is less likely to be influenced by the combustion gas flow to the opened first opening portion, hence the above-described problem in that the second opening portion opens when the opening is not desired can be prevented.

In the gas generator of the fifth aspect, the arrangement patterns of the plurality of first opening portions and the plurality of second opening portions are based on arrangement patterns (a) to (f) of the second aspect of the invention.

The plurality of first opening portions and the plurality of second opening portions may be formed in a plurality of rows at intervals in the axial direction of the housing having a cylinder shape, and in this case, the plurality of first opening portions and the plurality of second opening portions may be arranged in different arrangement patterns selected from (a) to (f) for each row. The arrangement patterns (a) to (f) are the same as the arrangement patterns (a) to (f) of the second aspect of the invention.

The gas generator according to the present invention includes the gas discharge port including the plurality of first opening portions having low burst pressure (P1) of the closing member and the plurality of second opening portions having burst pressure (P2) higher than the burst pressure (P1), hence, the second opening portions are less likely to be influenced by the combustion gas flow to the opened first opening portions, and thus, the problem in that the second opening portion opens when the opening is not desired can be prevented.

The gas generator according to the present invention can be used as a gas generator for an airbag device mounted in a vehicle.

EMBODIMENTS OF THE INVENTION

1. Gas Generator Having Arrangement Pattern of Gas Discharge Ports Illustrated in FIG. 2

A gas generator according to an embodiment of the present invention is same as a known gas generator having a housing that accommodates a gas generating agent, an igniter, a filter, and the like, except for an arrangement pattern of gas discharge ports. The number of the igniter may be one or more.

FIG. 1 is a perspective view of a gas generator 100 including a housing 101.

The housing 101 is constituted of a top plate 102, a bottom plate 103 opposing the top plate 102 in an axial direction, and a peripheral wall 104 between the top plate 102 and the bottom plate 103, and includes a flange part 105 that is used to attach the housing to a module case.

The housing 101 has a disk shape in which a ratio of axial length L to an outer diameter D satisfies relationship, L/D≤1.1.

FIG. 1 illustrates a configuration in which first gas discharge ports (first opening portions) 11, 12, and the like, and second gas discharge ports (second opening portions) 31, 32, and the like, are formed only in the peripheral wall 104, but a configuration in which the gas discharge ports are formed only in the top plate 102 or a configuration in which the gas discharge ports are formed in both the top plate 102 and the peripheral wall 104 may be employed.

Furthermore, in FIG. 1, the gas discharge ports are formed only in a single row in the circumferential direction, but the gas discharge ports may be formed in a plurality of rows at intervals in the axial direction.

Figure 2:
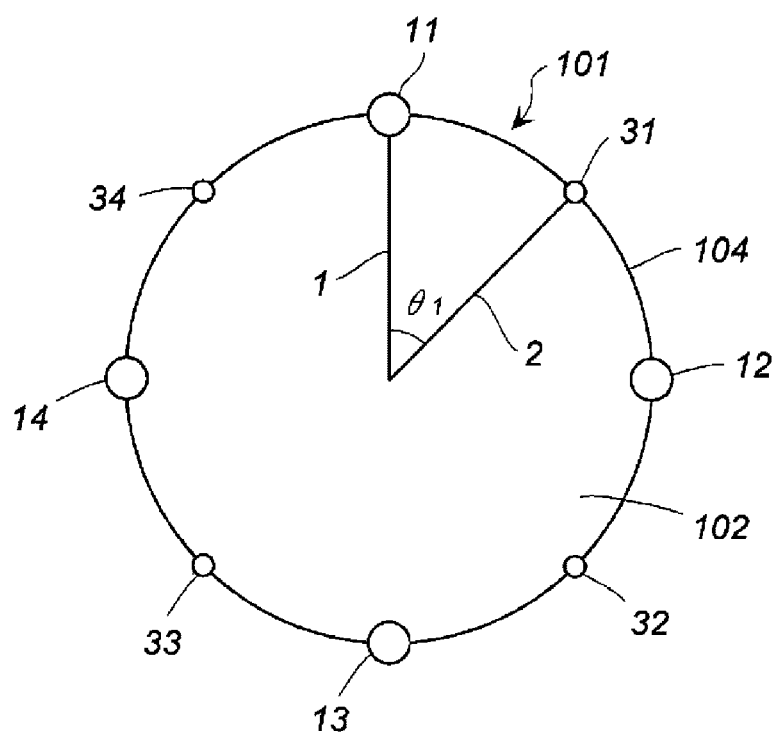
FIG. 2 is a plan view illustrating an arrangement pattern in which gas discharge ports are formed in a peripheral wall of the housing, and is drawn such that positions of gas discharge ports not visible in a plan view can be seen.

FIG. 2 illustrates the arrangement pattern of the gas discharge ports formed on the peripheral wall 104 of the housing 101 such that the arrangement pattern can be easily understood.

The embodiment illustrated in each of figures below is described as a configuration in which the gas discharge ports are arranged in the peripheral wall 104 of the housing.

In the arrangement pattern of the gas discharge ports illustrated in FIG. 2, a plurality of first opening portions 11 to 14 having low burst pressure (P1) of a closing member that closes the gas discharge port, and a plurality of second opening portions 31 to 34 having burst pressure (P2) of the closing member higher than the burst pressure (P1) are arranged in combination.

An opening diameter of the first opening portions 11 to 14 is larger than an opening diameter of the second opening portions 31 to 34, and the first opening portions 11 to 14 and the second opening portions 31 to 34 are all closed, from inside, by the same metallic seal tape. Thus, the burst pressure (P1) of the first opening portions 11 to 14 is lower than the burst pressure (P2) of the second opening portions 31 to 34 (P1<P2).

The first opening portions 11 to 14 and the second opening portions 31 to 34 are alternately arranged on the same circumference. Here, "on the same circumference" means that all of the centers of the first opening portions 11 to 14 and the second opening portions 31 to 34 are on the same circumference. The following other embodiments include a configuration in which all of the centers of the plurality of first opening portions and the plurality of second opening portions are on the same circumference (on a peripheral wall surface).

The first opening portion 11 and the second opening portion 31, which are adjacent to each other in the circumference direction, are arranged in a manner that an angle (θ1) formed by a first center line 1 extending from a center of the same circle to a center of the first opening portion 11 and by a second center line 2 extending from the center of the same circle to a center of the second opening portion 31 is in a range from 15° to 65°.

Similarly, the second opening portion 31 and the first opening portion 12, the first opening portion 12 and the second opening portion 32, the second opening portion 32 and the first opening portion 13, the first opening portion 13 and the second opening portion 33, the second opening portion 33 and the first opening portion 14, and the first opening portion 14 and the second opening portion 34 are arranged adjacently in the circumference direction to conform to the above-described range of the angle (θ1).

When an airbag device using the gas generator 100 including the gas discharge ports of the arrangement pattern illustrated in FIG. 2 is operated and a gas generating agent is combusted thereby generating combustion gas, the first opening portions 11 to 14 having low burst pressure open first and subsequently the second opening portions 31 to 34 having high burst pressure open next, and thus the gas can be discharged with a time lag before inflating the airbag. In some cases, only the first opening portions 11 to 14 may open.

At this time, if the first opening portions 11 to 14 and the second opening portions 31 to 34 are arranged in proximity and when the closed first opening portions 11 to 14 open, then the combustion gas flow concentrates on the opened first opening portions 11 to 14. As a result, a problem may arise in which the neighboring second opening portions 31 to 34 open earlier than a prescribed opening time or open under a situation, where opening should not occur, due to the influence of the combustion gas flow.

This problem may occur in both a single type gas generator including one igniter and a dual type gas generator including two igniters, but in particular, this problem may be a critical problem for the dual type gas generator in which two igniters are activated with a time lag.

However, in the gas generator having the arrangement pattern of the gas discharge ports illustrated in FIG. 2, the first opening portions 11 to 14 and the second opening portions 31 to 34 are arranged at a predetermined angle (θ1), and the second opening portions 31 to 34 are less likely to be influenced by the combustion gas flow to the opened first opening portions 11 to 14, and thus, the above-described problem in that the second opening portions 31 to 34 open earlier than a prescribed opening time does not occur.

2. Gas Generator Having Arrangement Pattern of Gas Discharge Ports Illustrated in FIG. 3

Figure 3:
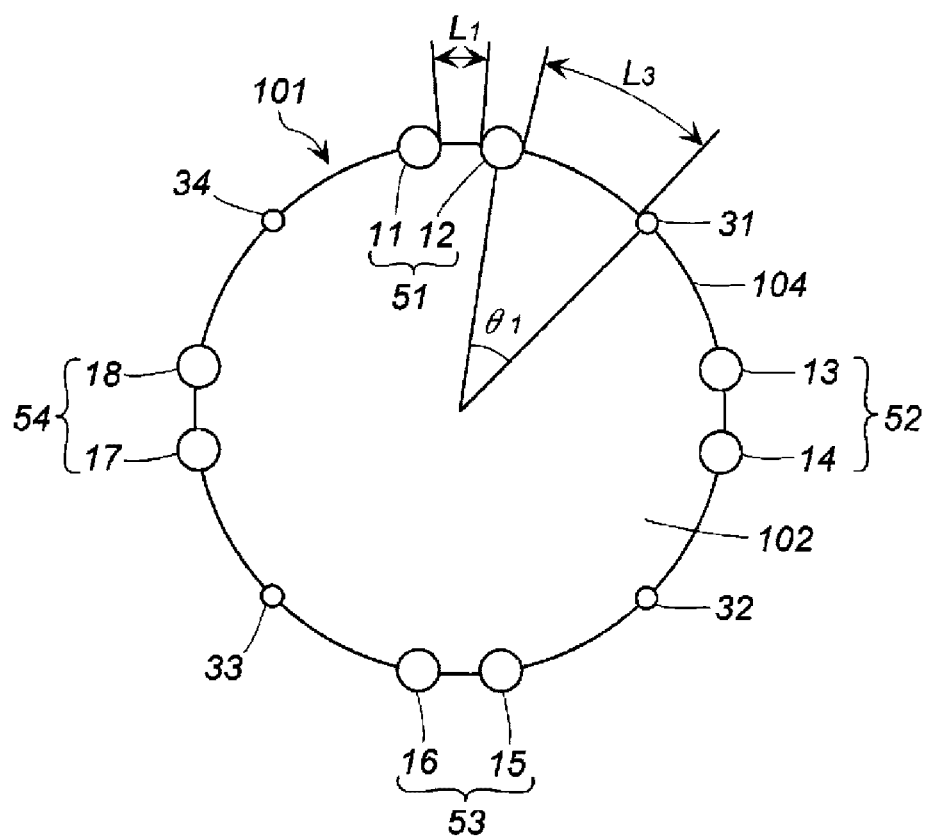
FIG. 3 is a plan view that is similar to FIG. 2 to illustrate an arrangement pattern of gas discharge ports according to another embodiment.

FIG. 3 illustrates the gas discharge ports having the above-described arrangement pattern (a).

The first opening portions 11 and 12 form Group 1 with a number 51, the first opening portions 13 and 14 form Group-2 52, the first opening portions 15 and 16 form Group-3 53, the first opening portions 17 and 18 form Group-4 54, and the Groups-1 to 4 from 51 to 54 are arranged mutually at equal intervals.

The second opening portion 31 is arranged at an intermediate position between Group-1 51 and Group-2 52, the second opening portion 32 is arranged at an intermediate position between Group-2 52 and Group-3 53, the second opening portion 33 is arranged at an intermediate position between Group-3 53 and Group-4 54, and the second opening portion 34 is arranged at an intermediate position between Group-4 54 and Group-1 51.

The first opening portion 12 in Group-1 51 and the second opening portion 31 adjacent thereto in the circumference direction are arranged in a manner that an angle (θ1) formed by center lines extending from the center of the same circle (that is, the center of the top plate 102) to the first opening portion 12 and to the second opening portion 31 is in a range from 15° to 65°.

Similarly to the first opening portion 12 and the second opening portion 31 described above, each of angles (θ1) between a line to the second opening portion 31 and a line to the first opening portion 13, between a line to the first opening portion 14 and a line to the second opening portion 32, between a line to the second opening portion 32 and a line to the first opening portion 15, between a line to the first opening portion 16 and a line to the second opening portion 33, between a line to the second opening portion 33 and a line to the first opening portion 17, between a line to the first opening portion 18 and a line to the second opening portion 34, and between a line to the second opening portion 34 and a line to the first opening portion 11 is also in the range from 15° to 65°, with the opening portions being arranged adjacently.

In this way, with the arrangement pattern, in which θ1=15° to 65° is prescribed, as illustrated in FIG. 3, an effect similar to the effect of the arrangement pattern illustrated in FIG. 2 can be obtained.

In addition, in the arrangement pattern (a) illustrated in FIG. 3, intervals between two first opening portions forming each of the first opening portion groups 51 to 54 are all equal (L1). Here, the interval between two first opening portions is, for example, a distance between arcs (a part of the circumference of each arch and arcs of portions where two first opening portions come closest to each other) of the first opening portion 11 and the first opening portion 12. This applies to other embodiments below.

An interval (L3) between the first opening portion forming the first opening portion groups 51 to 54 and the second opening portion adjacent to the first opening portion in the circumference direction has relationship of L1<L3.

In FIG. 3, for example, the interval between the first opening portion 11 and the first opening portion 12 in Group-1 51 is L1, and the interval between the first opening portion 12 and the second opening portion 31 is L3.

L3/L1 is preferably in a range from 1 to 27.

By associating the intervals L1 and L3 in this manner, an effect similar to the effect of the case, in which θ1=from 15° to 65°, can also be obtained.

Note that, for example, even when the opening diameter of the first opening portion 12 and the opening diameter of the second opening portion 31 increase or decrease, θ1 is constant, but L3 increases or decreases. In particular, when the opening diameter of the first opening portion 12 and the opening diameter of the second opening portion 31 become large, even if θ1 is constant, the first opening portion 12 and the second opening portion 31 are brought closer to each other, and thus, the arrangement pattern of the gas discharge port is preferably adjusted not only in addition to θ1 but also in consideration of the relationship between L1 and L3.

However, the opening diameter of the first opening portion 12 and the opening diameter of the second opening portion 31 are of course limited relative to the strength of the housing, and thus, the arrangement pattern of the gas discharge ports can be practically controlled by θ1 alone. This applies to each of the embodiments (arrangement patterns of gas discharge ports) below.

3. Gas Generator Having Arrangement Pattern of Gas Discharge Ports Illustrated in FIG. 4

Figure 4:
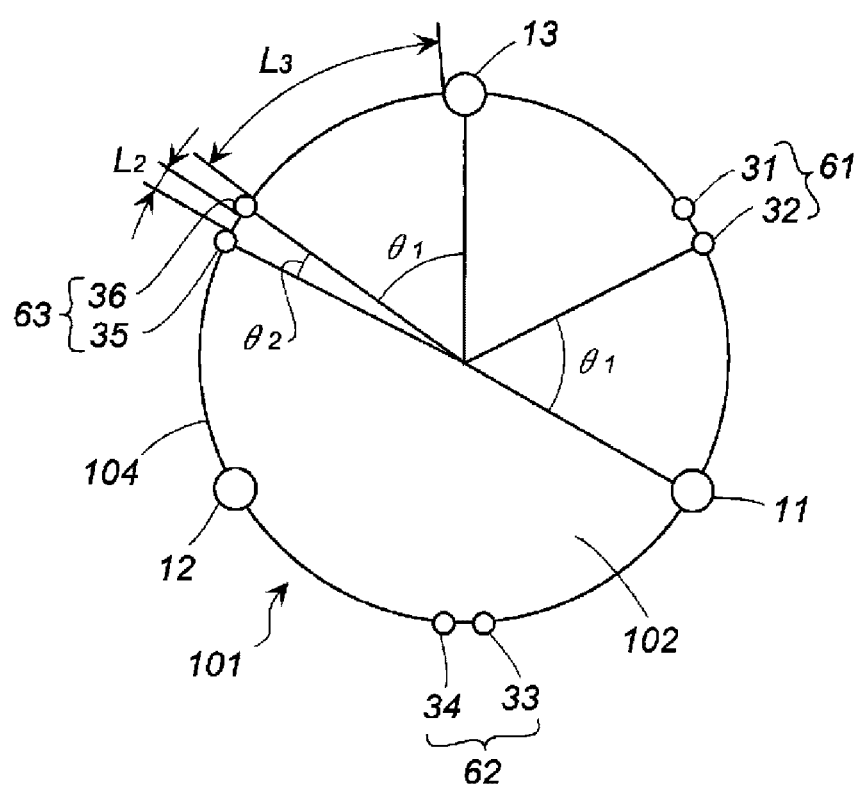
FIG. 4 is a plan view that is similar to FIG. 2 to illustrate an arrangement pattern of gas discharge ports according to still another embodiment.

FIG. 4 illustrates the gas discharge ports having the above-described arrangement pattern (b).

The second opening portions 31 and 32 form Group-1 61, the second opening portions 33 and 34 form Group-2 62, the second opening portions 35 and 36 form Group-3 63, and Group-1 to Group-3 61 to 63 are arranged at equal intervals.

The first opening portion 11 is arranged at an intermediate position between Group-1 61 and Group-2 62, the first opening portion 12 is arranged at an intermediate position between Group-2 62 and Group-3 63, and the first opening portion 13 is arranged at an intermediate position between Group-3 63 and Group-1 61.

The second opening portion 32 in Group-1 61 and the first opening portion 11 adjacent thereto in the circumference direction are arranged in a manner that an angle (θ1) formed by center lines extending from the center of the same circle (that is, the center of the top plate 102) to the second opening portion 32 and to the first opening portion 11 is in a range from 15° to 65°.

Similarly to the second opening portion 32 and first opening portion 11 described above, each of angles (θ1) between a line to the first opening portion 11 and a line to the second opening portion 33, between a line to the second opening portion 34 and a line to the first opening portion 12, between a line to the first opening portion 12 and a line the second opening portion 35, and between a line to the second opening portion 36 and a line to the first opening portion 13 is also in the range from 15° to 65°, with the opening portions being arranged adjacently.

In Group-1 61 to Group-3 63, an angle (θ2) formed by two center lines extending from the center of the same circle (that is, the center of the top plate 102) to respective centers of adjacent second opening portions is arranged to be in a range from 10° to 30°, with θ1>θ2 being satisfied.

In FIG. 4, an angle formed by lines extending from the center of the same circle to the center of the second opening portion 31 and to the center of the second opening portion 32 is in the range from 10° to 30°.

In this way, with the arrangement pattern, in which θ1=15° to 65°, θ2=10° to 30°, and θ1>θ2, as illustrated in FIG. 4, an effect similar the effect of the arrangement pattern illustrated in FIG. 2 can be obtained.

In addition, in the arrangement pattern (b) illustrated in FIG. 4, intervals between two second opening portions forming each of the second opening portion groups 61 to 63 are all equal (L2). Here, the interval between two second opening portions is, for example, a length of an arc between the second opening portion 31 and the second opening portion 32 (a part of the circumference, namely a length between two second opening portions coming closer to each other).

The interval (L2) between the second opening portions forming the second opening portion groups 61 to 63 and the interval (L3) between the second opening portion and the first opening portion adjacent thereto in the circumference direction have relationship of L2<L3.

In FIG. 4, for example, the interval between the second opening portion 35 and the second opening portion 36 in Group 3 numbered 63 is L2, and the interval between the second opening portion 36 and the first opening portion 13 is L3.

L3/L2 is preferably in a range from 1 to 15.

By associating the intervals L2 and L3 in this manner, an effect similar to the effect of the case in which θ1=15° to 65° can be obtained.

4. Gas Generator Having Arrangement Pattern of Gas Discharge Ports Illustrated in FIG. 5

Figure 5:
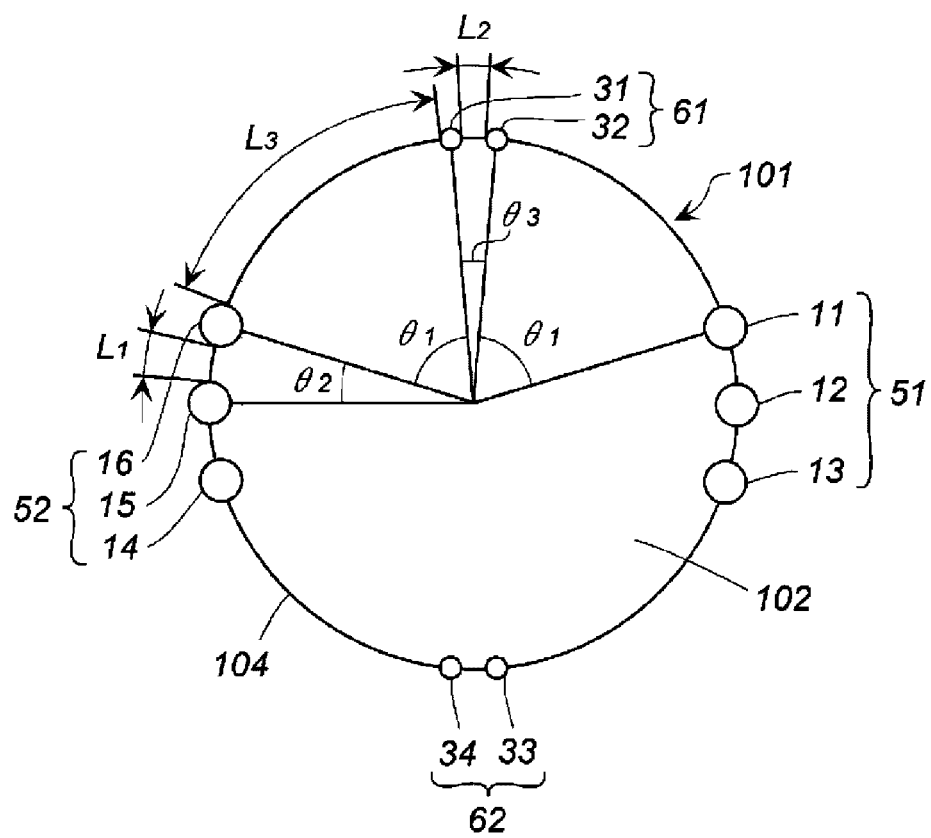
FIG. 5 is a plan view that is similar to FIG. 2 to illustrate an arrangement pattern of gas discharge ports according to yet another embodiment.

FIG. 5 illustrates the gas discharge ports having the above-described arrangement pattern (c).

The second opening portions 31 and 32 form Group-1b 61, the second opening portions 33 and 34 form Group-2b 62, the first opening portions 11, 12, and 13 form Group 1a numbered 51, the first opening portions 14, 15, and 16 form Group-2a 52; and Group-1b 61, Group-1a 51, Group-2b 62, and Group-2a 52 are arranged in this order at equal intervals on the same circumference.

The second opening portions 31 to 34 in Group-1b 61 and Group-2b 62 respectively, and the first opening portions 11 and 13 in Group-1a 51 and the first opening portions 14 and 16 in Group 2a that are adjacent thereto in the circumference direction are arranged in a manner that an angle (θ1) formed by two center lines extending from the center of the same circle (that is, the center of the top plate 102) to the centers of adjacent first opening portion and second opening portion is in a range from 15° to 65°.

In Group-1a 51 and Group-2a 52, an angle (θ2) formed by two center lines extending from the center of the same circle (that is, the center of the top plate 102) to the centers of adjacent first opening portions is arranged to be in a range from 10° to 30°, with θ1>θ2 being satisfied.

In FIG. 5, the angle (θ2) formed by lines extending from the center of the circle to the center of the first opening portion 15 and to the center of the first opening portion 16 is in the range from 10° to 30°.

In Group-1b 61 and Group-2b 62, an angle (θ3) formed by two center lines extending from the center of the same circle (that is, the center of the top plate 102) to the centers of adjacent second opening portions is arranged to be in the range from 10° to 30°, with θ1>θ3 being satisfied.

In FIG. 5, the angle (θ3) formed by lines extending from the center of the same circle to the center of the second opening portion 31 and to the center of the second opening portion 32 is in the range from 10° to 30°.

In this way, with the arrangement pattern, in which θ1=15° to 65°, θ2=10° to 30°, θ3=10° to 30°, θ1>θ2, and θ1>θ3, as illustrated in FIG. 5, an effect similar to the effect of the arrangement pattern illustrated in FIG. 2 can be obtained.

In addition, in the arrangement pattern (c) illustrated in FIG. 5, the intervals (L1) between the plurality of first opening portions forming Group-1a 51 and Group-2a 52, which are the first opening portion groups, are equal, and the intervals (L2) between the plurality of second opening portions forming Group-1b 61 and Group-2b 62, which are the second opening portion groups, are equal.

The interval (L3) between the first opening portion and the second opening portion provided adjacently in the circumference direction has relationships of L3>L1 and L3>L2. For example, the intervals among the first opening portions 11 to 13 in Group-1a 51 are L1, the intervals between the second opening portions 31 and 32 in Group-1b 61 are L2, the interval between the second opening portion 32 and the first opening portion 11 is L3, and the relationships thereof are L3>L1 and L3>L2. L3/L1 is preferably in the range from 1 to 27 and L3/L2 is preferably in the range from 1 to 15.

By associating the intervals L1, L2, and L3 in this manner, an effect similar to the effect of the case in which θ1=15° to 65° can be obtained.

5. Gas Generator Having Arrangement Pattern of Gas Discharge Ports Illustrated in FIG. 6

Figure 6:
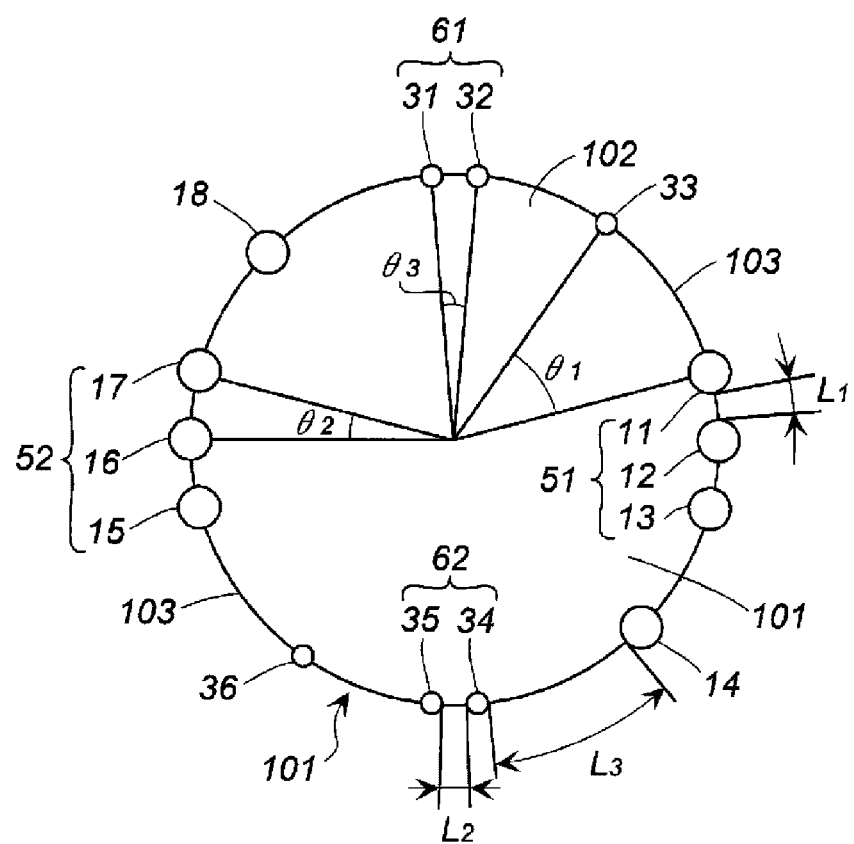
FIG. 6 is a plan view that is similar to FIG. 2 to illustrate an arrangement pattern of gas discharge ports according to a still further embodiment.

FIG. 6 illustrates the gas discharge ports having the above-described arrangement pattern (d).

Group-1b 61 formed of the second opening portions 31 and 32 is arranged, and Group-2b 62 formed of the second opening portions 34 and 35 is arranged at a position radially opposing Group-1b 61.

Group-1a 51 formed of the first opening portions 11 to 13 is arranged between Group-1b 61 and Group-2b 62, and Group-2a 52 formed of the first opening portions 15 to 17 is arranged at a position radially opposing Group-1a 51.

The second opening portion 33 is arranged independently between Group-1b 61 and Group-1a 51, the first opening portion 14 is arranged independently between Group-1a 51 and Group-2b 62, the second opening portion 36 is arranged independently between Group-2b 62 and Group-2a 52, and the first opening portion 18 is arranged independently between Group-2a 52 and Group-1b 61.

The second opening portions 33 being arranged independently and the first opening portion 11 in Group-1a 51 adjacent thereto in the circumference direction are arranged in a manner that an angle (θ1) formed by center lines extending from the center of the same circle (that is, the center of the top plate 102) to the second opening portion 33 and to the first opening portion 11 is in a range from 15° to 65°.

Similarly to the second opening portion 33 and the first opening portion 11 described above, each of angles (θ1) between a line to the first opening portion 14 and a line to the second opening portion 34, between a line to the second opening portion 36 and a line to the first opening portion 15, and between a line to the first opening portion 18 and a line to the second opening portion 31 is also in the range from 15° to 65°, with the opening portions being arranged adjacently.

In Group-1a 51 and Group-2a 52, an angle (θ2) formed by two center lines extending from the center of the same circle (that is, the center of the top plate 102) to the centers of adjacent first opening portions is arranged to be in a range from 10° to 30°, with θ1>θ2 being satisfied.

For example, in FIG. 6, the angle (θ2) formed by lines extending from the center of the same circle to the center of the first opening portion 15 and to the center of the first opening portion 16 is in the range from 10° to 30°.

In Group-1b 61 and Group-2b 62, an angle (θ3) formed by two center lines extending from the center of the same circle (that is, the center of the top plate 102) to the centers of adjacent second opening portions is arranged to be in the range from 10° to 30°, with θ1>θ3 being satisfied.

For example, in FIG. 6, the angle (θ3) formed by lines extending from the center of the same circle to the center of the second opening portion 31 and to the center of the second opening portion 32 is in the range from 10° to 30°.

In this way, with the arrangement pattern in which θ1=15° to 65°, θ2=10° to 30°, θ3=10° to 30°, θ1>θ2, and θ1>θ3 as illustrated in FIG. 6, an effect similar to the effect of the arrangement pattern illustrated in FIG. 2 can be obtained.

In addition, in the arrangement pattern (d) illustrated in FIG. 6, the intervals (L1) between the plurality of first opening portions forming Group-1a 51 and Group-2a 52, which are the first opening portion groups, are equal, and the intervals (L2) between the plurality of second opening portions forming Group-1b 61 and Group-2b 62, which are the second opening portion groups, are equal.

The interval (L3) between the first opening portion and the second opening portion, which are adjacent to each other in the circumference direction, has relationships of L3>L1 and L3>L2. For example, the intervals among the first opening portions 11 to 13 in Group-1a 51 are L1, the interval between the second opening portions 34 and 35 in Group-1b 62 is L2, the interval between the second opening portion 34 and the first opening portion 14 is L3, and relationships thereof are L3>L1 and L3>L2. L3/L1 is preferably in the range from 1 to 27 and L3/L2 is preferably in the range from 1 to 15.

By associating the intervals L1, L2, and L3 in this manner, an effect similar to the effect of the case in which θ1=15° to 65° can be also obtained.

6. Gas Generator Having Arrangement Pattern of Gas Discharge Ports Illustrated in FIG. 7

Figure 7:
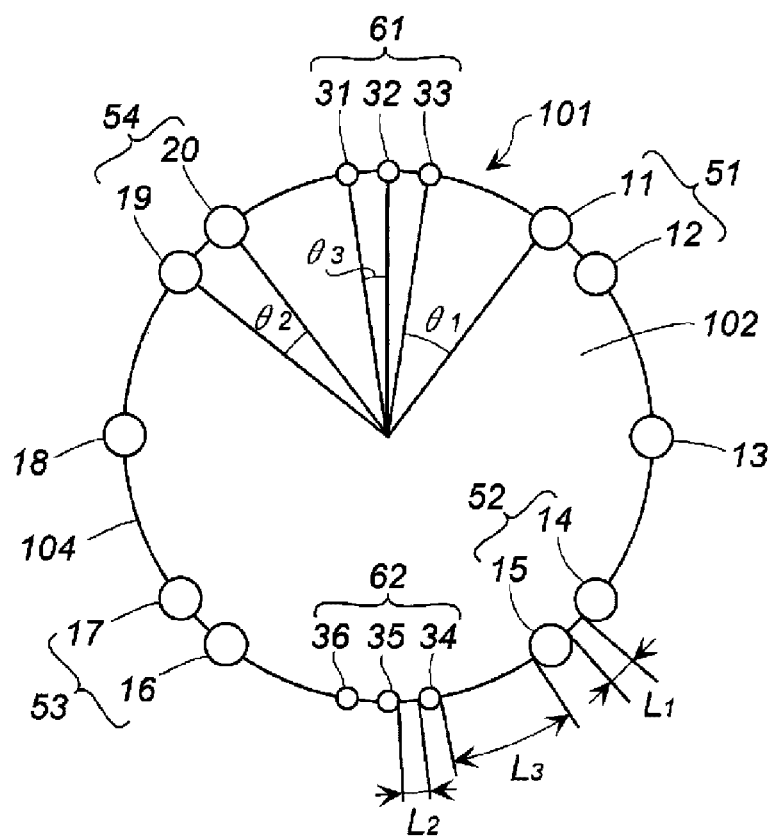
FIG. 7 is a plan view that is similar to FIG. 2 to illustrate an arrangement pattern of gas discharge ports according to a still further embodiment.

Another embodiment of the arrangement pattern (d) illustrated in FIG. 7 is as follows.

Group-1b 61 formed of the second opening portions 31 to 33 is arranged, and with Group-1b 61 being a starting point, Group-1a 51 formed of the first opening portions 11 and 12, the first opening portion 13 that is arranged independently, Group-2a 52 formed of the first opening portions 14 and 15, Group-2b 62 formed of the second opening portions 34 to 36, Group-3a 53 formed of the first opening portions 16 and 17, the first opening portion 18 that is arranged independently, and Group-4a 54 formed of the first opening portions 19 and 20 are arranged, in this order, in the circumference direction.

The second opening portion 33 in Group-1b 61 and the first opening portion 11 in Group-1a 51 adjacent thereto in the circumference direction are arranged in a manner that an angle (θ1) formed by center lines extending from the center of the same circle (the center of the top plate 102) to the second opening portion 33 and to the first opening portion 11 is in a range from 15° to 65°.

Similarly to the second opening portion 33 and the first opening portion 11 described above, each of angles (θ1) between a line to the first opening portion 15 and a line to the second opening portion 34, between a line to the second opening portion 36 and a line to the first opening portion 16, and between a line to the first opening portion 20 and a line to the second opening portion 31 is also in the range from 15° to 65°, with the opening portions being arranged adjacently.

In Group-1a 51 to Group-4a 54, an angle (θ2) formed by two center lines extending from the center of the same circle (that is, the center of the top plate 102) to the centers of adjacent first opening portions is arranged to be in a range from 10° to 30°, with θ1>θ2 being satisfied.

For example, in FIG. 7, the angle (θ2) formed by lines extending from the center of the same circle to the center of the first opening portion 11 and to the center of the first opening portion 12 is in the range from 10° to 30°.

In Group-1b 61 and Group-2b 62, an angle (θ3) formed by two center lines extending from the center of the same circle (that is, the center of the top plate 102) the centers of adjacent second opening portions is arranged to be in the range from 10° to 30°, with θ1>θ3 being satisfied.

For example, in FIG. 7, the angle (θ3) formed by lines extending from the center to the center of the second opening portion 31 and to the center of the second opening portion 32, and an angle formed by lines extending from the center to the center of the second opening portion 32 and to the center of the second opening portion 33 are in the range from 10° to 30°.

In this way, with the arrangement pattern in which θ1=15° to 65°, θ2=10° to 30°, θ3=10° to 30°, θ1>θ2, and θ1>θ3 as illustrated in FIG. 7, an effect similar to the effect of the arrangement pattern illustrated in FIG. 2 can be obtained.

In addition, in the other embodiment of the arrangement pattern (d) illustrated in FIG. 7, the intervals (L1) between the plurality of first opening portions forming Group-1a 51 to Group-4a 54, which are the first opening portion groups, are equal, and the intervals (L2) between the plurality of second opening portions forming Group-1b 61 and Group-2b 62, which are the second opening portion groups, are equal.

The interval (L3) between the first opening portion and the second opening portion, which are adjacent to each other in the circumference direction, has relationships of L3>L1 and L3>L2.

For example, the interval between the first opening portions 11 and 12 in Group-1a 51 is L1, the interval between the second opening portions 31 and 32 in Group-1b 61 is L2, the interval between the second opening portion 33 and the first opening portion 11 is L3, and relationships thereof are L3>L1 and L3>L2. L3/L1 is preferably in the range from 1 to 27 and L3/L2 is preferably in the range from 1 to 15.

By associating the intervals L1, L2, and L3 in this manner, an effect similar to the effect of the case in which θ1=from 15° to 65° can be obtained.

7. Gas Generator Having Arrangement Pattern of Gas Discharge Ports Illustrated in FIG. 8

Figure 8:
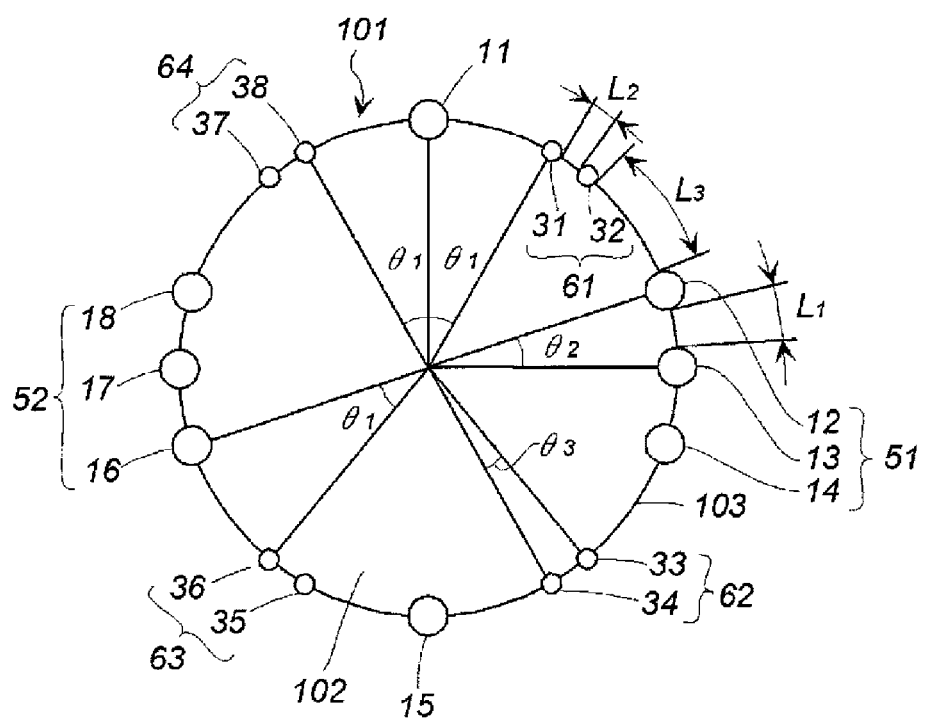
FIG. 8 is a plan view that is similar to FIG. 2 to illustrate an arrangement pattern of gas discharge ports according to a still further embodiment.

FIG. 8 illustrates the gas discharge ports having the above-described arrangement pattern (e).

The arrangement pattern (e) includes:

an embodiment in which one first opening portion 11 is arranged among four second opening portions 31, 32, 37, and 38 of Group-1b 61 and Group-4b 64, and an embodiment in which one first opening portion 15 is arranged among four second opening portions 33 to 36 of Group-2b 62 and Group-3b 63.

The arrangement pattern (e) also includes:

an embodiment in which one first opening portion 11 is located at an intermediate position between two groups, i.e., Group-1b 61 (second opening portions 31 and 32) and Group-4b 64 (second opening portions 37 and 38), and an embodiment in which one first opening portion 15 is located at an intermediate position between two groups, i.e., Group-2b 62 (second opening portions 33 and 34) and Group-3b 63 (second opening portions 35 and 36).

The first opening portion 11 is arranged independently, and with the first opening portion 11 being a starting point, Group-1b 61 formed of the second opening portions 31 and 32, Group-1a 51 formed of the first opening portions 12 to 14, Group-2b 62 formed of the second opening portions 33 and 34, the first opening portion 15 that is arranged independently, Group-3b 63 formed of the second opening portions 35 and 36, Group-2a 52 formed of the first opening portions 16 to 18, and Group 4b formed of the second opening portions 37 and 38 are arranged in the circumference direction.

The first opening portion 11 and the second opening portion 31 in Group-1b 61 adjacent thereto in the circumference direction are arranged in a manner that an angle ($\theta$1) formed by center lines extending from the center of the same circle (that is, the center of the top plate 102) to the first opening portion 11 and to the second opening portion 31 is in a range from 15° to 65°.

Similarly to the first opening portion 11 and the second opening portion 31 described above, each of angles ($\theta$1) between a line to the second opening portion 32 and a line to the first opening portion 12, between a line to the first opening portion 14 and a line to the second opening portion 33, between a line to the second opening portion 34 and a line to the first opening portion 15, between a line to the first opening portion 15 and a line to the second opening portion 35, between a line to the second opening portion 36 and a line to the first opening portion 16, between a line to the first opening portion 18 and a line to the second opening portion 37, and between a line to the second opening portion 38 and a line to the first opening portion 11 is also in the range from 15° to 65°, with the opening portions being arranged adjacently.

In Group-1a 51 and Group-2a 52, an angle ($\theta$2) formed by two center lines extending from the center of the same circle (that is, the center of the top plate 102) to the centers of adjacent first opening portions is arranged to be in a range from 10° to 30°, with $\theta$1>$\theta$2 being satisfied.

For example, in FIG. 8, the angle ($\theta$2) formed by lines extending from the center of the same circle to the center of the first opening portion 12 and to the center of the first opening portion 13, and the angle ($\theta$2) formed by lines extending from the center of the same circle to the center of the first opening portion 13 and to the center of the first opening portion 14 are in the range from 10° to 30°.

In Group-1b 61 to Group-4b 64, the angle ($\theta$3) formed by two center lines extending from the center of the same circle (that is, the center of the top plate 102) to the centers of adjacent second opening portions is arranged to be in the range from 10° to 30°, with $\theta$1>$\theta$3 being satisfied. For example, in FIG. 8, the angle ($\theta$3) formed by lines extending from the center of the same circle to the center of the second opening portion 31 and to the center of the second opening portion 32, and the angle ($\theta$3) formed by lines extending from the center of the same circle to the center of the second opening portion 33 and to the center of the second opening portion 34 are in the range from 10° to 30°.

In this way, with the arrangement pattern in which $\theta$1=15° to 65°, $\theta$2=10° to 30°, $\theta$3=10° to 30°, $\theta$1>$\theta$2, and $\theta$1>$\theta$3 as illustrated in FIG. 8, an effect similar to the effect of the arrangement pattern illustrated in FIG. 2 can be obtained.

In addition, in the arrangement pattern (e) illustrated in FIG. 8, the intervals (L1) between the plurality of first opening portions forming Group-1a 51 and Group-2a 52 are equal, and the intervals (L2) between the plurality of second opening portions forming Group-1b 61 to Group-4b 64 are equal.

The interval (L3) between the first opening portion and the second opening portion, which are adjacent to each other in the circumference direction, has relationships of L3>L1 and L3>L2.

For example, the intervals among the first opening portions 12 to 14 in Group-1a 51 are L1, the interval between the second opening portions 31 and 32 in Group-1b 61 is L2, the intervals between the first opening portion 11 and the second opening portion 31 and between the second opening portion 32 and the first opening portion 12 are L3, and relationships thereof are L3>L1 and L3>L2. L3/L1 is preferably in the range from 1 to 27 and L3/L2 is preferably in the range from 1 to 15.

By associating the intervals L1, L2, and L3 in this manner, an effect similar to the effect of the case in which 01=from 15° to 65° can also be obtained.

9. Gas Generator Having Arrangement Pattern Including Partially Above-Described (a) to (e)

An arrangement pattern (f) is an arrangement pattern partially including the above-described arrangement patterns (a) to (e). For example, the arrangement pattern (a) occupies ½ of the arrangement pattern in the circumference direction and the arrangement pattern (b) occupies the remaining ½ of the same in the circumference direction.

In a gas generator having each of the above-described arrangement patterns of the gas discharge ports, when the gas discharge ports are arranged in the peripheral wall 104 as illustrated in FIG. 1, the gas discharge ports may be arranged at different positions in the height direction (axial direction).

In addition, when the gas discharge ports are arranged on the top plate 102 in FIG. 1, the gas discharge ports may be arranged in a plurality of rows to form multiple circles.

10. Gas Generator Having Arrangement Pattern of Gas Discharge Ports Illustrated in FIG. 9

Figure 9:
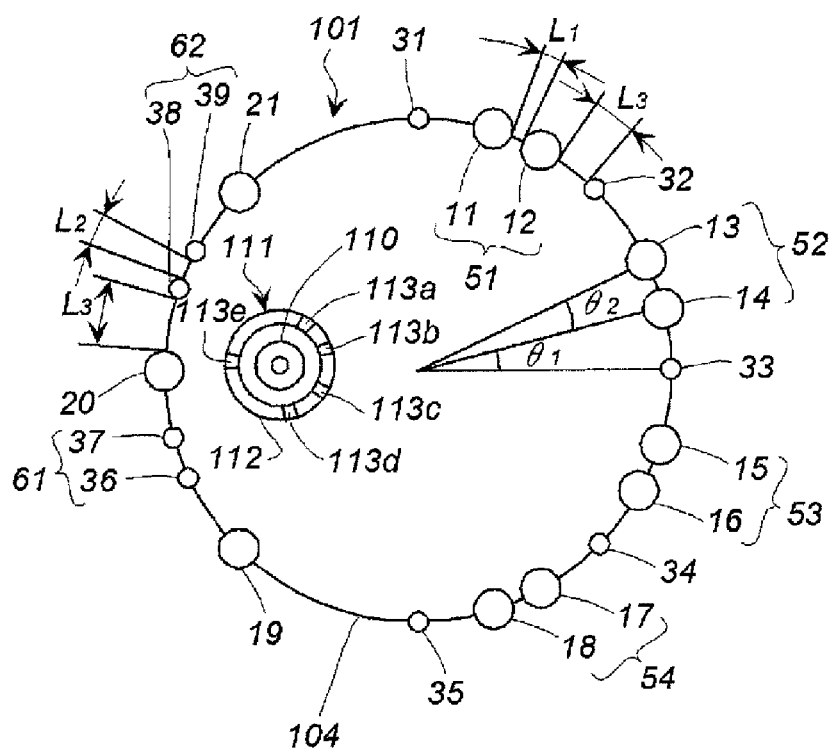
FIG. 9 is a perspective view of a gas generator according to another embodiment.

The housing 101 of the gas generator illustrated in FIG. 9 has the same external shape as illustrated in FIG. 1, and an igniter 110 is fixed to the bottom plate 103 and is accommodated in a cup member 111.

The cup member 111 includes a bottom surface part, a peripheral wall 112, and an opening portion, and is arranged such that the opening portion side thereof abuts against the bottom plate 103, and the bottom surface part is located close to or abuts against the top plate 102.

A transfer charge (not illustrated) is accommodated in a space, which does not include a space for the igniter 110, in the cup member 111. The transfer charge is the same as a transfer charge used in a known gas generator, and in addition to that, a gas generating agent that functions as a transfer charge can be also used.

The cup member 111 has a circular shape in a plan view and includes a plurality of flame-transferring holes 113a to 113e in the peripheral wall 112.

The flame-transferring holes 113a to 113d of the plurality of flame-transferring holes 113a to 113e of the cup member 111 are formed on a semicircular side (first semicircular side) of the peripheral wall of the cup member 111, and the remaining flame-transferring hole 113e is formed on the remaining semicircular side (second semicircular side).

The cup member 111 is located at a position eccentrically with respect to the center of the housing 101, the first semicircular side (the flame-transferring holes 113a to 113d side) is arranged at a position far from the peripheral wall 104 of the housing 101, and the second semicircular side (the flame-transferring hole 113e side) is arranged at a position closer to the peripheral wall 104 of the housing 101.

The arrangement pattern of the gas generator illustrated in FIG. 9 corresponds to the arrangement pattern (e).

The second opening portion 31 is arranged independently, and with the second opening portion 31 being a starting point, Group-1a 51 formed of the first opening portions 11 and 12, the second opening portion 32 that is arranged independently, Group-2a 52 formed of the first opening portions 13 and 14, the second opening portion 33 that is arranged independently, Group-3a 53 formed of the first opening portions 15 and 16, the second opening portion 34 that is arranged independently, Group-4a 54 formed of the first opening portions 17 and 18, and the second opening portion 35 that is arranged independently are arranged on a ½ circumference.

Furthermore, with the second opening portion 35, which is arranged independently, being a starting point, the first opening portion 19 that is arranged independently, Group-1b 61 formed of the second opening portions 36 and 37, the first opening portion 20 that is arranged independently, Group-2b 62 formed of the second opening portions 38 and 39, the first opening portion 21 that is arranged independently, and the second opening portion 31 that is arranged independently are arranged on the remaining ½ circumference.

The second opening portion 31 and the second opening portion 35 are positioned intermediate between two semi-circumferences.

The first opening portion 11 and the second opening portion 31 adjacent thereto in the circumference direction are arranged in a manner that an angle (θ1) formed by center lines extending from the center of the same circle (that is, the center of the top plate 102) to the first opening portion 11 and to the second opening portion 31 is in a range from 15° to 65°.

Similarly to the first opening portion 11 and the second opening portion 31 described above, each of angles (θ1) between a line to the second opening portion 32 and lines to the first opening portions 12 and 13, between a line to the second opening portion 33 and lines to the first opening portions 14 and 15, between a line to the second opening portion 34 and lines to the first opening portions 16 and 17, between a line to the first opening portion 18 and lines to the second opening portion 35, between a line to the first opening portion 19 and a line to the second opening portion 36, between a line to the first opening portion 20 and lines to the second opening portions 37 and 38, and between a line to the first opening portion 21 and a line to the second opening portion 39 is also in the range from 15° to 65°, with the opening portions being arranged adjacently.

In Group-1a 51 to Group-4a 54, an angle (θ2) formed by two center lines extending from the center of the same circle (that is, the center of the top plate 102) to the centers of adjacent first opening portions is arranged to be in a range from 10° to 30°, with θ1>θ2 being satisfied.

For example, in FIG. 9, the angle (θ2) formed by lines extending from the center of the same circle to the center of the first opening portion 11 and to the center of the first opening portion 12 is in the range from 10° to 30°.

In Group-1b 61 to Group-2b 62, an angle (θ3) formed by two center lines extending from the center of the same circle (that is, the center of the top plate 102) to the centers of adjacent second opening portions is arranged to be in the range from 10° to 30°, with θ1>θ3 being satisfied.

For example, in FIG. 9, the angle (θ3) (not illustrated) formed by lines extending from the center to the center of the second opening portion 36 and to the center of the second opening portion 37 is in the range from 10° to 30°.

In this way, with the arrangement pattern in which θ1=15° to 65°, θ2=10° to 30°, θ3=10° to 30°, θ1>θ2, and θ1>θ3 as illustrated in FIG. 9, an effect similar to the effect of the arrangement pattern illustrated in FIG. 2 can be obtained.

In addition, in the arrangement pattern (e) illustrated in FIG. 9, the intervals (L1) among the plurality of first opening portions forming Group-1a 51 to Group-4a 54 are equal, and the intervals (L2) between the plurality of second opening portions forming Group-1b 61 and Group-2b 62 are equal.

The interval (L3) between the first opening portion and the second opening portion, which are adjacent to each other in the circumference direction, has relationships of L3>L1 and L3>L2.

For example, the interval between the first opening portions 11 and 12 in Group-1a 51 is L1, the interval between the first opening portion 12 and the second opening portion 32 is L3, the interval between the first opening portion 11 and the second opening portion 31 is L3, and relationship thereof is L3>L1. For example, the interval between the second opening portions 36 and 37 in Group-1b 61 is L2, the interval between the first opening portion 19 and the second opening portion 36 is L3, the interval between the first opening portion 19 and the second opening portion 35 is L3, and relationship thereof is L3>L2. L3/L1 is preferably in the range from 1 to 27 and L3/L2 is preferably in the range from 1 to 15.

By associating the intervals L1, L2, and L3 in this manner, an effect similar to the effect of the case in which θ1=from 15° to 65° can be also obtained.

In the cup member 111, when a semicircular side of the housing 101 corresponding to the first semicircular side, on which the flame-transferring holes 113a to 113d are formed, is defined as a first semicircular region (from the second opening portion 31, through Group-1a 51, to the second opening portion 35), and a semicircular side of the housing 101 corresponding to the second semicircular side, on which the flame-transferring hole 113e is formed, is defined as a second semicircular region (from the second opening portion 35, through the first opening portion 19, to the second opening portion 31), a ratio (A2/A1) of total opening area (A2) of the plurality of first opening portions and the plurality of second opening portions, which are formed in the second semicircular region, to total opening area (A1) of the plurality of first opening portions and the plurality of second opening portions, which are formed in the first semicircular region, is in a range from 0.25 to 0.40.

When the igniter 110 of the airbag device using the gas generator including the gas discharge ports of the arrangement pattern illustrated in FIG. 9 is operated, a combustion product such as flame is released from the flame-transferring holes 113a to 113e of the cup member 111.

At this time, as compared to the flame-transferring hole 113e, a greater amount of combustion product is released from the flame-transferring holes 113a to 113d into the housing (inside the combustion chamber), whereby the gas generating agent is ignited and burnt to generate combustion gas.

Distances from the flame-transferring holes 113a to 113d to the peripheral wall 104 of the housing are greater than a distance from the flame-transferring hole 113e to the housing peripheral wall 104, and more gas generating agents are accommodated in the first semicircular region. However, due to a large amount of combustion product that is released from the flame-transferring holes 113a to 113d and due to the relationship of A2/A1=0.25 to 0.40, the gas generating agents filled in this region undergo combustion rapidly.

On the other hand, although the release amount of combustion product that is released from the flame-transferring hole 113e is small, the distance therefrom to the peripheral wall 104 of the housing is close, and the amount of gas generating agents is small, hence, the combustion of the gas generating agents filled in the second semicircular region undergoes at a timing equivalent to that of the gas generating agents in the first semicircular region.

Thereafter, the combustion gas is discharged from the first opening portions 11 to 21 that open first, and is then discharged from the second opening portions 31 to 39 that open subsequently. Alternatively, the combustion gas is discharged only from the first opening portions 11 to 21, depending on conditions.

In such operation process, as described above, in the arrangement pattern in which $\theta1=15°$ to $65°$, $\theta2=10°$ to $30°$, $\theta3=10°$ to $30°$, $\theta1>\theta2$, and $\theta1>\theta3$ are satisfied, and also in the arrangement pattern in which L3>L1 and L3>L2 are satisfied, the second opening portions 31 to 39 receive no influence of the combustion gas flow discharged from the first opening portions 11 to 21, therefore, do not open.

11. Gas Generator Illustrated in FIG. 10

Figure 10:
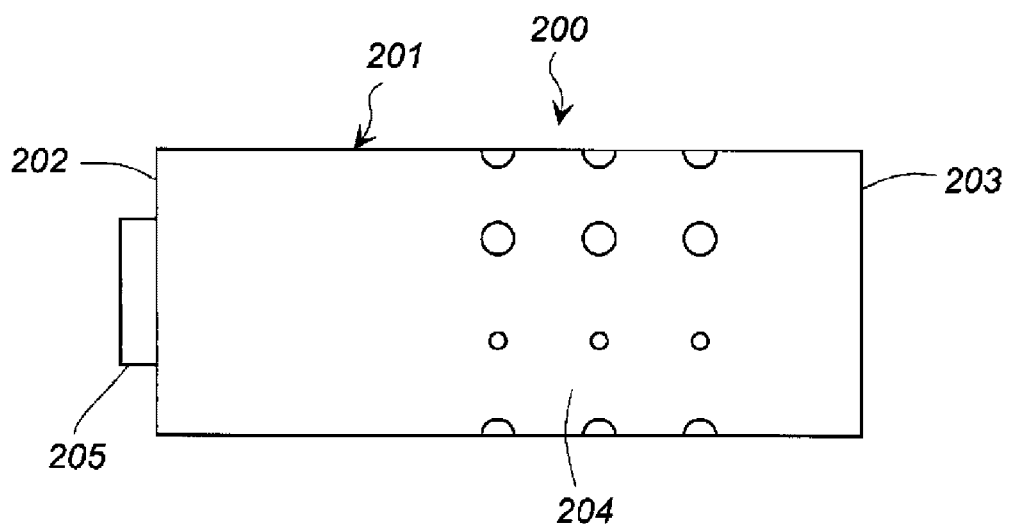
FIG. 10 is a perspective view of a gas generator according to a still further embodiment.

A gas generator 200 illustrated in FIG. 10 has a circular shape in a cross section in a width direction, and includes a tubular housing 201 having a ratio of an axial length L to an outer diameter D, which satisfies relationship, L/D>1.1

In the tubular housing 201, an igniter 205 is fixed to a first end portion 202, a second end portion 203 is closed, and a gas discharge port is formed in a peripheral wall 204. A gas generating agent is accommodated in an internal space (combustion chamber) of the tubular housing 201.

In the tubular housing 201 of the gas generator illustrated in FIG. 10, gas discharge ports having, in combination, the first opening portions and the second opening portions each having one of the above-described arrangement patterns (a) to (f) can be formed. In FIG. 10, the arrangement pattern (a) (FIG. 3) is illustrated.

The gas discharge ports having, in combination, the first opening portions and the second opening portions satisfy some or all of the requirements, i.e., $\theta1=15°$ to $65°$, $\theta2=10°$ to $30°$, $\theta3=10°$ to $30°$, $\theta1>\theta2$, $\theta1>\theta3$, L3>L1, and L3>L2, and thus, the second opening portions receives no influence of the opened first opening portions, therefore, do not open during operation.

The present invention has been described as above. Of course, the present invention includes various forms of modifications within the scope thereof, and these modifications do not depart from the scope of the invention. All of what a person with ordinary skill in the art will clearly consider as a variation of the present invention is within the scope of the claims set forth below.

The invention claimed is:

1. A gas generator comprising:
   a housing having a circular shape and a ratio of an axial length L to an outer diameter D thereof satisfying a relationship, L/D<1.1;
   a gas generating agent;
   an igniter; and
   gas discharge ports provided in the housing and being closed by a closing member, the gas discharge ports including, in combination, a plurality of first opening portions having low burst pressure (P1) of the closing member and a plurality of second opening portions having burst pressure (P2) higher than the burst pressure (P1), the plurality of first opening portions and the plurality of second opening portions being formed at intervals on a circumference of a same circle in at least one of the peripheral wall and the top plate, the plurality of first opening portions forming a plurality of first opening portion groups, with each group being spaced apart from each other, the plurality of second opening portions forming a plurality of second opening portion groups, with each group being spaced apart from each other, and the first opening portion groups and the second opening portion groups are arranged at intervals in a circumference direction,
   an arrangement pattern of the plurality of first opening portions and the plurality of second opening portions being selected from one of
   an arrangement pattern (a) in which, one of a first opening portion and a second opening portion is arranged independently among one of,
   (i) between the first opening portion group and the second opening portion group,
   (ii) between the first opening portion groups, and
   (iii) between the second opening portion groups; and
   an arrangement pattern (b) in which one of, (i) the plurality of second opening portions is arranged independently between the first opening portion groups, or (ii) the plurality of first opening portions is arranged independently between the second opening portion groups.

2. The gas generator according to claim 1, wherein in the arrangement patterns (a) and (b), one of the plurality of the first opening portions and one of the plurality of second opening portions which are adjacent to each other in a circumference direction, are arranged such that an angle (θ1) formed by a first center line extending from a center of the same circle to a center of the one of the plurality of the first opening portions and a second center line extending from the center of the same circle to a center of the one of the plurality of the second opening portions is in a range from 15° to 65°, intervals between the plurality of second opening portions forming the second opening portion group are equal, and an angle (θ2) formed by two center lines extending from the center of the same circle to the centers of adjacent second opening portions is arranged to be in a range from 10° to 30°, with θ1>θ2 being satisfied.

3. The gas generator according to claim 1, wherein intervals (L1) between the plurality of first opening portions forming the first opening portion group are equal, intervals (L2) between the plurality of second opening portions forming the second opening portion group are equal, and the L1, the L2, and an interval (L3) between the first opening portion and the second opening portion, which is adjacent to each other in the circumference direction, satisfy relationships of L3>L1 and L3>L2.

4. The gas generator according to claim 1, wherein in the arrangement pattern, intervals (L1) between the plurality of first opening portions forming the first opening portion group are equal, intervals (L2) between the plurality of second opening portions forming the second opening portion group are equal, and the L1, the L2, and an interval (L3) between the first opening portion arranged independently between the first opening portion group and the second opening portion group and the second opening portion in the second opening portion group adjacent to the first opening portion arranged independently, or an interval (L3) between the second opening portion arranged independently between the first opening portion group and the second opening portion group and the first opening portion in the first opening portion group adjacent to the second opening portion arranged independently satisfy relationships of L3>L1 and L3>L2.

5. The gas generator according to claim 1, wherein intervals (L1) between the plurality of first opening portions forming the first opening portion group are equal, and the L1 and an interval (L3) between the first opening portion and the second opening portion adjacent thereto in the circumference direction satisfy relationship of L3>L1; and intervals (L2) between the plurality of second opening portions forming the second opening portion group are equal, and the L2 and an interval (L3) between the second opening portion and the first opening portion adjacent thereto in the circumference direction satisfy relationship of L3>L2.

6. The gas generator according to claim 1, wherein in the arrangement pattern (b), intervals (L2) between the plurality of second opening portions forming the second opening portion group are equal, and the L2 and an interval (L3) between the second opening portion and the first opening portion adjacent thereto in the circumference direction satisfy relationship of L3>L2.

7. A gas generator, comprising:

a housing having a circular shape and a ratio of an axial length L to an outer diameter D thereof satisfying a relationship, L/D<1.1;

gas discharge ports provided in the housing and being closed by a closing member, the gas discharge ports including, in combination, a plurality of first opening portions having low burst pressure (P1) of the closing member and a plurality of second opening portions having burst pressure (P2) higher than the burst pressure (P1), the plurality of first opening portions and the plurality of second opening portions being formed at intervals on a circumference of a same circle in at least one of the peripheral wall and the top plate, one of the plurality of first opening portions and one of the plurality of second opening portions which are adjacent to each other in a circumference direction, are arranged such that an angle ($\theta 1$) formed by a first center line extending from a center of the same circle to a center of the one of the plurality of the first opening portions and a second center line extending from the center of the same circle to a center of the one of the plurality of the second opening portions is in a range from 15° to 65°, an arrangement pattern of the plurality of first opening portions and the plurality of second opening portions being selected from one of:

an arrangement pattern (a) in which the plurality of first opening portions form a plurality of first opening portion groups, with each of the plurality of first opening portion groups being spaced apart from each other, and one of the plurality of second opening portions is arranged between the first opening portion groups; and an arrangement pattern (b) in which the plurality of second opening portions form a plurality of second opening portion groups, with each of the plurality of second opening portion groups being spaced apart from each other, and one of the plurality of first opening portions is arranged between the second opening portion groups.

8. The gas generator according to claim 7, wherein in the arrangement (b), intervals between the plurality of second opening portions forming the second opening portion group are equal, and an angle ($\theta 2$) formed by two center lines extending from the center of the same circle to the centers of adjacent second opening portions is arranged to be in a range from 10° to 30°, with $\theta 1 > \theta 2$ being satisfied.

9. The gas generator according to claim 7, wherein in the arrangement pattern (a), intervals (L1) between the plurality of first opening portions forming the first opening portion group are equal, and the L1 and an interval (L3) between the first opening portion and the second opening portion adjacent thereto in the circumference direction satisfy relationship of L1<L3.

* * * * *